(12) United States Patent
Suzuki et al.

(10) Patent No.: US 12,227,185 B2
(45) Date of Patent: *Feb. 18, 2025

(54) VEHICLE, METHOD OF CONTROLLING VEHICLE, AND VEHICLE CONTROL INTERFACE BOX

(71) Applicant: TOYOTA JIDOSHA KABUSHIKI KAISHA, Toyota (JP)

(72) Inventors: Ikuma Suzuki, Okazaki (JP); Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

This patent is subject to a terminal disclaimer.

(21) Appl. No.: 17/945,433

(22) Filed: Sep. 15, 2022

(65) Prior Publication Data

US 2023/0111175 A1  Apr. 13, 2023

(30) Foreign Application Priority Data

Sep. 28, 2021 (JP) ................................ 2021-157623

(51) Int. Cl.
 *B60W 30/18* (2012.01)
 *B60W 30/14* (2006.01)
 *B60W 60/00* (2020.01)

(52) U.S. Cl.
 CPC .... *B60W 30/18027* (2013.01); *B60W 30/143* (2013.01); *B60W 30/18054* (2013.01); *B60W 60/001* (2020.02)

(58) Field of Classification Search
 CPC .......................... B60T 7/22; B60W 30/18027
 See application file for complete search history.

(56) References Cited

U.S. PATENT DOCUMENTS

| | | | |
|---|---|---|---|
| 9,280,145 B2 | 3/2016 | Hannon | |
| 10,525,979 B1 | 1/2020 | Grant | |
| 10,940,864 B2* | 3/2021 | Heckmann | G08G 1/165 |
| 10,996,673 B1 | 5/2021 | Katzourakis et al. | |
| 11,130,501 B2 | 9/2021 | Liu et al. | |

(Continued)

FOREIGN PATENT DOCUMENTS

| | | |
|---|---|---|
| DE | 10-2014-204287 A1 | 9/2015 |
| JP | 2005-178628 A | 7/2005 |

(Continued)

OTHER PUBLICATIONS

Nov. 9, 2022 Notice of Allowance issued in U.S. Appl. No. 17/154,010.

(Continued)

*Primary Examiner* — Long T Tran
(74) *Attorney, Agent, or Firm* — Oliff PLC

(57) ABSTRACT

An ADS performs processing including setting an acceleration command to V1 when an autonomous state is set to an autonomous mode, when the acceleration command has a value indicating deceleration, when a vehicle velocity is zero, and when a standstill command is set to "Applied" and setting an immobilization command to "Applied" when a traveling direction of a vehicle indicates a standstill status, when there is a wheellock request, and when predetermined time has elapsed since the vehicle came to a standstill.

14 Claims, 15 Drawing Sheets

(56) References Cited

U.S. PATENT DOCUMENTS

| | | | |
|---|---|---|---|
| 11,691,644 B2 * | 7/2023 | Suzuki | B60W 10/182 |
| | | | 701/26 |
| 2007/0173984 A1 | 7/2007 | Nakayama | |
| 2014/0277990 A1 | 9/2014 | Zambou | |
| 2015/0146328 A1 | 5/2015 | Mikami et al. | |
| 2015/0244207 A1 | 8/2015 | Narita | |
| 2015/0251639 A1 | 9/2015 | Sautter et al. | |
| 2016/0016590 A1 | 1/2016 | Fernandez Pozo et al. | |
| 2016/0167653 A1 | 6/2016 | Malone et al. | |
| 2016/0221549 A1 | 8/2016 | Tanase et al. | |
| 2016/0377508 A1 | 12/2016 | Perrone et al. | |
| 2017/0361872 A1 | 12/2017 | Gupta et al. | |
| 2018/0208166 A1 | 7/2018 | Eckert | |
| 2018/0299898 A1 | 10/2018 | Luo et al. | |
| 2018/0345921 A1 | 12/2018 | Mannherz et al. | |
| 2019/0220006 A1 | 7/2019 | Ueno | |
| 2019/0227546 A1 | 7/2019 | Sato | |
| 2019/0300008 A1 | 10/2019 | Ando | |
| 2019/0332106 A1 | 10/2019 | Belloni Mourao et al. | |
| 2021/0039633 A1 | 2/2021 | Seo et al. | |
| 2021/0229697 A1 | 7/2021 | Lee et al. | |
| 2021/0237722 A1 | 8/2021 | Suzuki et al. | |
| 2021/0237765 A1 | 8/2021 | Ando | |
| 2021/0237766 A1 | 8/2021 | Suzuki et al. | |
| 2021/0245654 A1 | 8/2021 | Ando | |
| 2021/0245778 A1 | 8/2021 | Suzuki et al. | |
| 2021/0245779 A1 * | 8/2021 | Suzuki | B60W 50/029 |
| 2021/0245785 A1 | 8/2021 | Suzuki et al. | |
| 2021/0245806 A1 | 8/2021 | Suzuki et al. | |
| 2021/0247760 A1 * | 8/2021 | Kusama | B60W 30/188 |
| 2021/0247769 A1 | 8/2021 | Suzuki et al. | |
| 2021/0253090 A1 * | 8/2021 | Hayakawa | B60W 30/06 |
| 2021/0253123 A1 * | 8/2021 | Suzuki | B60W 30/181 |
| 2021/0276562 A1 * | 9/2021 | Suzuki | B60W 10/10 |
| 2021/0300392 A1 | 9/2021 | Shionome | |
| 2022/0032905 A1 | 2/2022 | Lee et al. | |
| 2022/0080935 A1 | 3/2022 | Terada et al. | |
| 2022/0097660 A1 | 3/2022 | Semenov et al. | |
| 2022/0126845 A1 | 4/2022 | Hsu et al. | |

FOREIGN PATENT DOCUMENTS

| | | |
|---|---|---|
| JP | 2007-230277 A | 9/2007 |
| JP | 2015-138330 A | 7/2015 |
| JP | 2018-506461 A | 3/2018 |
| JP | 2018-132015 A | 8/2018 |
| JP | 2019-127136 A | 8/2019 |
| JP | 2019-177807 A | 10/2019 |
| JP | 2021-123136 A | 8/2021 |
| JP | 2021-123139 A | 8/2021 |
| WO | 2002/049894 A2 | 6/2002 |
| WO | 2005/061267 A1 | 7/2005 |
| WO | 2016/100219 A1 | 6/2016 |
| WO | 2020/016622 A1 | 1/2020 |

OTHER PUBLICATIONS

Feb. 15, 2023 Notice of Allowance issued in U.S. Appl. No. 17/154,010.

Aug. 16, 2022 Office Action issued in U.S. Appl. No. 17/722,934.

Dec. 12, 2022 Office Action issued in U.S. Appl. No. 17/722,934.

Feb. 22, 2023 Notice of Allowance issued in U.S. Appl. No. 17/722,934.

Dec. 21, 2023 Office Action issued in U.S. Appl. No. 18/319,791.

May 7, 2024 Notice of Allowance issued in U.S. Appl. No. 18/319,791.

Herger, Mario. "Overview of Retrofit Kits for Autonomous Driving." https://th elastd riverlicenseholder.com/2017/1 0/21/overview-of-retrofit-kits-for-autonomous-driving/. Oct. 21, 2017.

* cited by examiner

FIG.10

| #1: CREATING A DRIVING PLAN | THE ADS CREATES A DRIVING PLAN. |
|---|---|
| #2: EXTRACTING PHYSICAL QUANTITIES | THE ADS EXTRACTS PHYSICAL CONTROL QUANTITIES FROM THE DRIVING PLAN. E.G. PHYSICAL CONTROL QUANTITIES := ACCELERATION, ROAD WHEEL ANGLE, ETC. |
| #3: SPLIT OF PHYSICAL QUANTITIES | THE ADS SPLITS THEM BY DEFINED CYCLE TIME OF EACH API. |
| #4: : EXECUTION OF AN API WITH THE VALUE | THE ADS EXECUTES AN API WITH THE SPLIT PHYSICAL QUANTITY. |
| #5: CALCULATION OF ITS BEHAVIOR | THE ADS CALCULATES THE VEHICLE BEHAVIOR, AND RECREATES A DRIVING PLAN TO WHICH THE VEHICLE BEHAVIOR IS REFLECTED |

VEHICLE, METHOD OF CONTROLLING VEHICLE, AND VEHICLE CONTROL INTERFACE BOX

This nonprovisional application is based on Japanese Patent Application No. 2021-157623 filed with the Japan Patent Office on Sep. 28, 2021, the entire contents of which are hereby incorporated by reference.

BACKGROUND

Field

The present disclosure relates to control of a vehicle during autonomous driving.

Description of the Background Art

An autonomous driving system for controlling a vehicle to travel without requiring an operation by a user has recently been developed. For being mountable on an existing vehicle, the autonomous driving system may be provided, for example, separately from the vehicle with an interface being interposed.

For example, Japanese Patent Laying-Open No. 2018-132015 discloses as such an autonomous driving system, a technique that allows addition of an autonomous driving function without great modification to an existing vehicle platform, by providing an electronic control unit (ECU) that manages motive power of a vehicle and an ECU for autonomous driving independently of each other.

SUMMARY

Since a user does not perform an operation during autonomous driving of a vehicle, in parking of the vehicle, rotation of wheels should be fixed at appropriate timing with the use of a parking brake or a parking lock.

An object of the present disclosure is to provide a vehicle on which an autonomous driving system is mountable, a method of controlling a vehicle, and a vehicle control interface box that allow fixing of rotation of wheels at appropriate timing during autonomous driving.

A vehicle according to one aspect of the present disclosure is a vehicle on which an autonomous driving system is mountable. The vehicle includes a vehicle platform that carries out vehicle control in accordance with a command from the autonomous driving system. The vehicle platform includes a base vehicle and a vehicle control interface box that interfaces between the autonomous driving system and the base vehicle. From the autonomous driving system to the base vehicle, an immobilization command including a first value indicating a request for immobilization of the vehicle is transmitted through the vehicle control interface box. From the base vehicle to the autonomous driving system, a signal indicating a standstill status of the vehicle is transmitted through the vehicle control interface box. The immobilization command is transmitted from the autonomous driving system through the vehicle control interface box to the base vehicle when a first condition including a condition that the vehicle is in the standstill status is satisfied. The base vehicle carries out immobilization of the vehicle in accordance with the immobilization command.

Thus, when the first condition including the condition that the vehicle is in the standstill status is satisfied, the immobilization command is transmitted from the autonomous driving system to the base vehicle. Therefore, immobilization of the vehicle (that is, fixing of rotation of wheels) can be carried out at appropriate timing during autonomous driving.

In one embodiment, the immobilization command further includes a second value indicating a request for release of immobilization of the vehicle. The immobilization command including the second value is transmitted from the autonomous driving system through the vehicle control interface box to the base vehicle when a second condition including a condition that the vehicle is in the standstill status is satisfied. The base vehicle releases immobilization of the vehicle in accordance with the immobilization command.

Thus, when the second condition including the condition that the vehicle is in the standstill status is satisfied, the immobilization command is transmitted from the autonomous driving system to the base vehicle. Therefore, immobilization of the vehicle can be released at appropriate timing during autonomous driving.

In one further embodiment, the first condition further includes a condition that predetermined time has elapsed since the vehicle came to a standstill.

Thus, since immobilization of the vehicle is carried out after lapse of predetermined time since the vehicle came to the standstill, immobilization of the vehicle can be carried out at appropriate timing during autonomous driving.

In one further embodiment, the base vehicle carries out immobilization of the vehicle when predetermined time has elapsed since the base vehicle received the immobilization command including the first value.

Thus, since immobilization of the vehicle is carried out after lapse of the predetermined time since the vehicle came to the standstill, immobilization of the vehicle can be carried out at appropriate timing during autonomous driving.

In one further embodiment, from the autonomous driving system to the base vehicle, an acceleration command including a deceleration value is transmitted through the vehicle control interface box. When the immobilization command requests immobilization of the vehicle, the acceleration command including a constant deceleration value is transmitted from the autonomous driving system through the vehicle control interface box to the base vehicle during a period from a standstill of the vehicle until issuance of a request for release of immobilization of the vehicle.

Thus, movement of the vehicle can be restricted for a period until release of immobilization of the vehicle is requested.

A method of controlling a vehicle according to another aspect of the present disclosure is a method of controlling a vehicle on which an autonomous driving system is mountable. The vehicle includes a vehicle platform that carries out vehicle control in accordance with a command from the autonomous driving system. The vehicle platform includes a base vehicle and a vehicle control interface box that interfaces between the autonomous driving system and the base vehicle. The method includes transmitting an immobilization command including a first value indicating a request for immobilization of the vehicle from the autonomous driving system to the base vehicle through the vehicle control interface box, transmitting a signal indicating a standstill status of the vehicle from the base vehicle to the autonomous driving system through the vehicle control interface box, transmitting the immobilization command from the autonomous driving system through the vehicle control interface box to the base vehicle when a first condition including a condition that the vehicle is in the standstill status is satisfied, and carrying out, by the base vehicle, immobilization of the vehicle in accordance with the immobilization command.

In one embodiment, the immobilization command further includes a second value indicating a request for release of immobilization of the vehicle. The method further includes transmitting the immobilization command including the second value from the autonomous driving system through the vehicle control interface box to the base vehicle when a second condition including a condition that the vehicle is in the standstill status is satisfied, and releasing, by the base vehicle, immobilization of the vehicle in accordance with the immobilization command.

In one further embodiment, the first condition further includes a condition that predetermined time has elapsed since the vehicle came to a standstill.

In one further embodiment, the method further includes carrying out, by the base vehicle, immobilization of the vehicle when predetermined time has elapsed since the base vehicle received the immobilization command including the first value.

In one further embodiment, the method further includes transmitting an acceleration command including a deceleration value from the autonomous driving system to the base vehicle through the vehicle control interface box and transmitting, when the immobilization command requests immobilization of the vehicle, the acceleration command including a constant deceleration value from the autonomous driving system through the vehicle control interface box to the base vehicle during a period from a standstill of the vehicle until issuance of a request for release of immobilization of the vehicle.

A vehicle control interface box according to yet another aspect of the present disclosure is a vehicle control interface box that interfaces between an autonomous driving system and a vehicle on which the autonomous driving system is mountable, the vehicle including a vehicle platform that carries out vehicle control in accordance with a command from the autonomous driving system. The vehicle platform includes a base vehicle. The vehicle control interface box transmits an immobilization command including a first value indicating a request for immobilization of the vehicle from the autonomous driving system to the base vehicle. The vehicle control interface box transmits a signal indicating a standstill status of the vehicle from the base vehicle to the autonomous driving system. The vehicle control interface box transmits the immobilization command from the autonomous driving system to the base vehicle when a first condition including a condition that the vehicle is in the standstill status is satisfied.

In one embodiment, the immobilization command further includes a second value indicating a request for release of immobilization of the vehicle. The vehicle control interface box transmits the immobilization command including the second value from the autonomous driving system to the base vehicle when a second condition including a condition that the vehicle is in the standstill status is satisfied.

In one further embodiment, the first condition further includes a condition that predetermined time has elapsed since the vehicle came to a standstill.

In one further embodiment, the vehicle control interface box transmits an acceleration command including a deceleration value from the autonomous driving system to the base vehicle. The vehicle control interface box transmits, when the immobilization command requests immobilization of the vehicle, the acceleration command including a constant deceleration value from the autonomous driving system to the base vehicle during a period from a standstill of the vehicle until issuance of a request for release of immobilization of the vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a diagram showing a typical workflow in the ADS.

DESCRIPTION OF THE PREFERRED EMBODIMENTS

Figure 1:
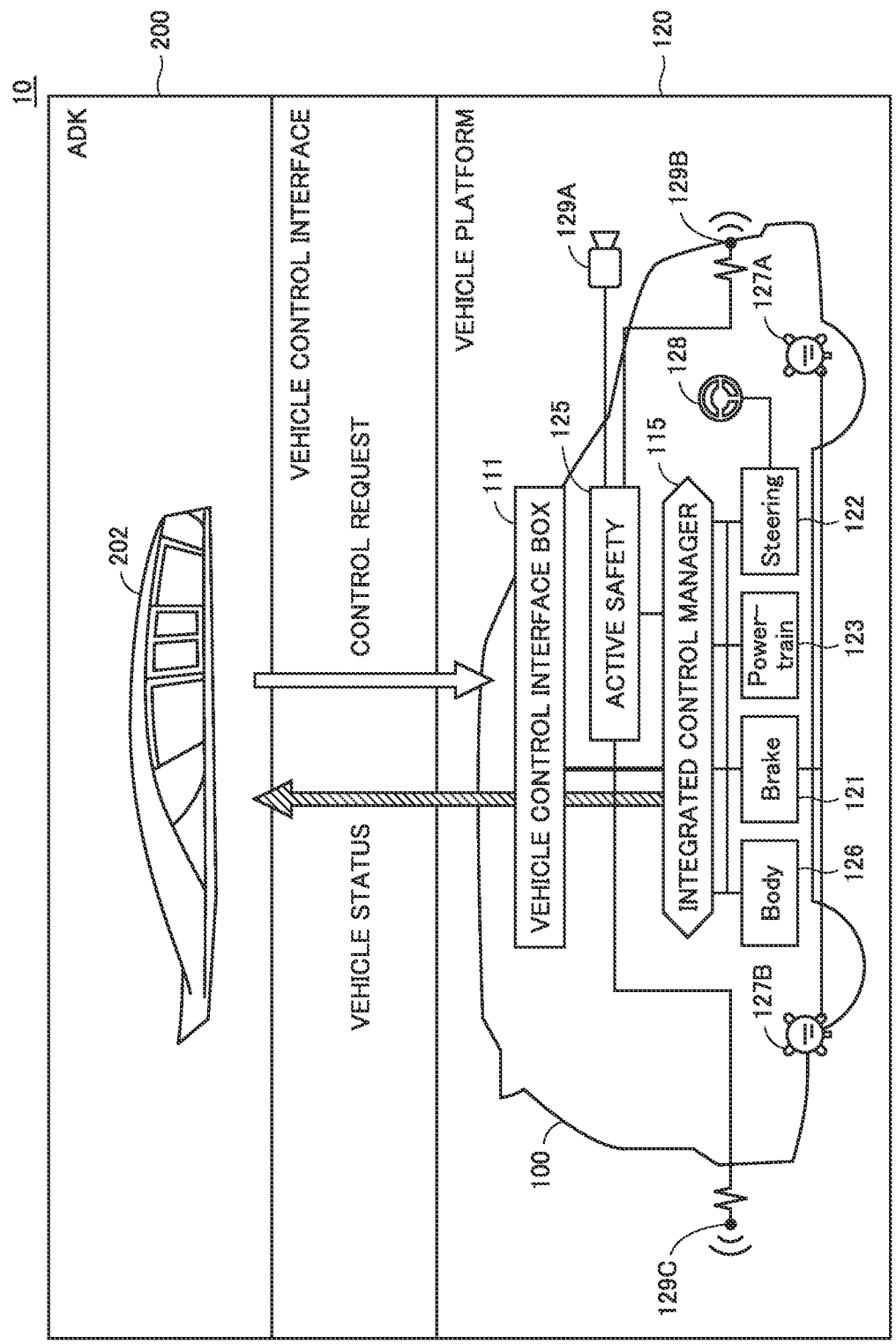
FIG. 1 is a diagram showing overview of a vehicle according to an embodiment of the present disclosure.

An embodiment of the present disclosure will be described below in detail with reference to the drawings. The same or corresponding elements in the drawings have the same reference characters allotted and description thereof will not be repeated.

FIG. 1 is a diagram showing overview of a vehicle 10 according to an embodiment of the present disclosure. Referring to FIG. 1, vehicle 10 includes an autonomous driving kit (which is denoted as "ADK" below) 200 and a vehicle platform (which is denoted as "VP" below) 120. ADK 200 and VP 120 are configured to communicate with each other through a vehicle control interface.

Vehicle 10 can carry out autonomous driving in accordance with control requests (commands) from ADK 200 attached to VP 120. Though FIG. 1 shows VP 120 and ADK 200 at positions distant from each other, ADK 200 is actually attached to a rooftop or the like of a base vehicle 100 which will be described later. ADK 200 can also be removed from VP 120. While ADK 200 is not attached, VP 120 can travel by driving by a user. In this case, VP 120 carries out travel control (travel control in accordance with an operation by a user) in a manual mode.

ADK 200 includes an autonomous driving system (which is denoted as "ADS" below) 202 for autonomous driving of vehicle 10. For example, ADS 202 creates a driving plan of vehicle 10 and outputs various commands (control requests) for travel of vehicle 10 in accordance with the created driving plan to VP 120 in accordance with an application program interface (API) defined for each command. ADS 202 receives various signals indicating statuses (vehicle statuses) of VP 120 from VP 120 in accordance with the API defined for each signal and has the received vehicle status reflected on creation of the driving plan. A detailed configuration of ADS 202 will be described later.

VP 120 includes base vehicle 100 and a vehicle control interface box (which is denoted as "VCIB" below) 111 that implements a vehicle control interface provided within base vehicle 100.

VCIB 111 can communicate with ADK 200 over a controller area network (CAN). VCIB 111 receives various commands from ADK 200 or outputs a status of VP 120 to ADK 200 by executing a prescribed API defined for each communicated signal. When VCIB 111 receives a control request from ADK 200, it outputs a control command corresponding to the control request to a system corresponding to the control command through an integrated control manager 115. VCIB 111 obtains various types of information on base vehicle 100 from various systems through integrated control manager 115 and outputs the status of base vehicle 100 as the vehicle status to ADK 200.

VP 120 includes various systems and various sensors for controlling base vehicle 100. As VP 120 carries out various types of vehicle control in accordance with a control request from ADK 200 (more specifically, ADS 202), autonomous driving of vehicle 10 is carried out. VP 120 includes, for example, a brake system 121, a steering system 122, a powertrain system 123, an active safety system 125, and a body system 126.

Brake system 121 is configured to control a plurality of braking apparatuses provided in wheels of base vehicle 100. The braking apparatus includes, for example, a disc brake system that is operated with a hydraulic pressure regulated by an actuator.

For example, wheel speed sensors 127A and 127B are connected to brake system 121. Wheel speed sensor 127A is provided, for example, in a front wheel of base vehicle 100 and detects a rotation speed of the front wheel. Wheel speed sensor 127A outputs the rotation speed of the front wheel to brake system 121. Wheel speed sensor 127B is provided, for example, in a rear wheel of base vehicle 100 and detects a rotation speed of the rear wheel. Wheel speed sensor 127B outputs the rotation speed of the rear wheel to brake system 121. Wheel speed sensors 127A and 127B each provide a pulsed signal as an output value (a pulse value). The rotation speed can be calculated based on the number of pulses in the pulsed signal. Brake system 121 outputs the rotation speed of each wheel to VCIB 111 as one of pieces of information included in a vehicle status.

Brake system 121 generates a braking command to a braking apparatus in accordance with a prescribed control request outputted from ADK 200 through VCIB 111 and integrated control manager 115 and controls the braking apparatus based on the generated braking command.

Steering system 122 is configured to control a steering angle of a steering wheel of vehicle 10 with a steering apparatus. The steering apparatus includes, for example, rack-and-pinion electric power steering (EPS) that allows adjustment of a steering angle by an actuator.

A pinion angle sensor 128 is connected to steering system 122. Pinion angle sensor 128 detects an angle of rotation of a pinion gear (a pinion angle) coupled to a rotation shaft of the actuator included in the steering apparatus. Pinion angle sensor 128 provides a detected pinion angle to steering system 122. Steering system 122 provides the pinion angle as one of pieces of information included in the vehicle status to VCIB 111.

Steering system 122 generates a steering command to the steering apparatus in accordance with a prescribed control request outputted from ADK 200 through VCIB 111 and integrated control manager 115. Steering system 122 controls the steering apparatus based on the generated steering command.

Powertrain system 123 controls an electric parking brake (EPB) provided in at least one of a plurality of wheels provided in vehicle 10, a P-Lock apparatus provided in a transmission of vehicle 10, a shift apparatus configured to select any shift range from among a plurality of shift ranges, and a drive source of vehicle 10. Detailed description will be given later.

Active safety system 125 detects an obstacle (an obstacle or a human) in front or in the rear with the use of a camera 129A and radar sensors 129B and 129C. When active safety system 125 determines that there is possibility of collision based on a distance to the obstacle or the like and a direction of movement of vehicle 10, it outputs a braking command to brake system 121 through integrated control manager 115 so as to increase braking force.

Body system 126 is configured to control, for example, components such as a direction indicator, a horn, or a wiper, depending on a status of travel or an environment around vehicle 10. Body system 126 controls the above-described component in accordance with a prescribed control request outputted from ADK 200 through VCIB 111 and integrated control manager 115.

Vehicle 10 may be adopted as one of constituent elements of a mobility as a service (MaaS) system. The MaaS system further includes, for example, a data server, a mobility service platform (which is denoted as "MSPF" below), and autonomous driving related mobility services (none of which is shown), in addition to vehicle 10.

Vehicle 10 further includes a data communication module (DCM) (not shown) as a communication interface (IT) to wirelessly communicate with the data server described above. The DCM outputs various types of vehicle information such as a speed, a position, or an autonomous driving state to the data server. The DCM receives from the autonomous driving related mobility services through the MSPF and the data server, various types of data for management of travel of an autonomous driving vehicle including vehicle 10 in the mobility services.

The MSPF is an integrated platform to which various mobility services are connected. In addition to autonomous driving related mobility services, not-shown various mobility services (for example, various mobility services provided by a ride-share company, a car-sharing company, an insurance company, a rent-a-car company, and a taxi company) are connected to the MSPF. Various mobility services including mobility services can use various functions provided by the MSPF by using APIs published on the MSPF, depending on service contents.

The autonomous driving related mobility services provide mobility services using an autonomous driving vehicle including vehicle 10. The mobility services can obtain operation control data of vehicle 10 that communicates with the data server or information stored in the data server from the MSPF by using the APIs published on the MSPF. The mobility services transmit data for managing an autonomous driving vehicle including vehicle 10 to the MSPF by using the API.

The MSPF publishes APIs for using various types of data on vehicle statuses and vehicle control necessary for development of the ADS. An ADS provider can use as the APIs, the data on the vehicle statuses and vehicle control necessary for development of the ADS stored in the data server.

Figure 2:
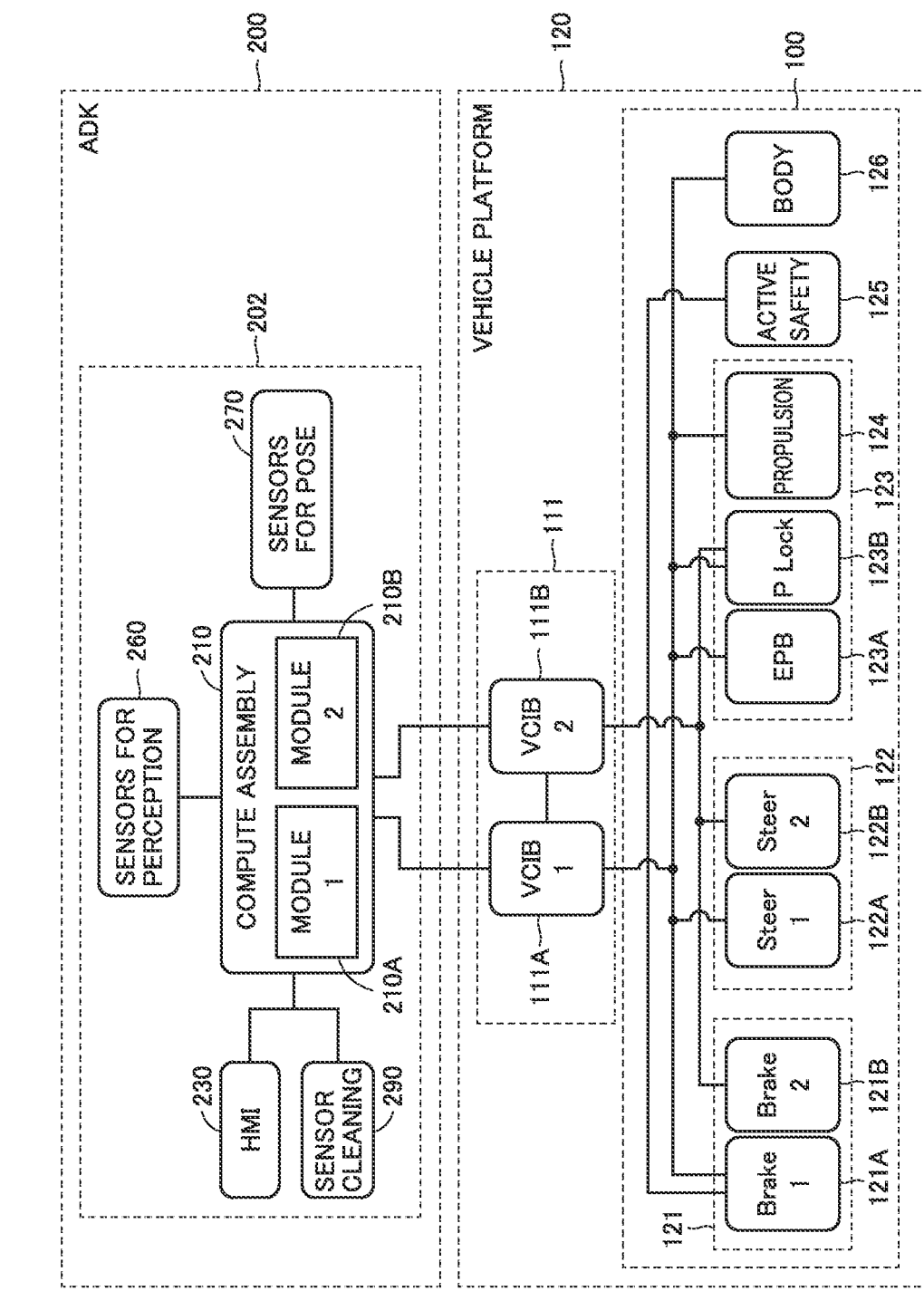
FIG. 2 is a diagram illustrating in detail, a configuration of an ADS, a VCIB, and a VP.

FIG. 2 is a diagram for illustrating in detail, a configuration of ADS 202, VCIB 111, and VP 120. As shown in FIG. 2, ADS 202 includes a compute assembly 210, a human machine interface (HMI) 230, sensors for perception 260, sensors for pose 270, and a sensor cleaning 290.

During autonomous driving of the vehicle, compute assembly 210 obtains information indicating an environment around the vehicle and information indicating a pose, a behavior, and a position of the vehicle from various sensors which will be described later, and obtains a vehicle status from VP 120 which will be described later through VCIB 111 and sets a next operation (acceleration, deceleration, or turning) of vehicle 10. Compute assembly 210 outputs various commands for realizing a set next operation of the vehicle to VCIB 111. Compute assembly 210 includes communication modules 210A and 210B. Communication modules 210A and 210B are configured to communicate with VCIB 111.

HMI 230 presents information to a user and accepts an operation by the user during autonomous driving, during driving requiring an operation by the user, or at the time of transition between autonomous driving and driving requiring an operation by the user. HMI 230 is constructed to be connected to an input and output apparatus such as a touch panel display, a display apparatus, and an operation apparatus provided in base vehicle 100.

Sensors for perception 260 include sensors that perceive an environment around vehicle 10 and include, for example, at least one of laser imaging detection and ranging (LIDAR), a millimeter-wave radar, and a camera.

The LIDAR refers to a distance measurement apparatus that measures a distance based on a time period from emission of pulsed laser beams (infrared rays) until return of the laser beams reflected by an object. The millimeter-wave radar is a distance measurement apparatus that measures a distance or a direction to an object by emitting radio waves short in wavelength to the object and detecting radio waves that return from the object. The camera is arranged, for example, on a rear side of a room mirror in a compartment and used for shooting an image of the front of the vehicle. Information obtained by sensors for perception 260 is outputted to compute assembly 210. As a result of image processing by artificial intelligence (AI) or an image processing processor onto images or video images shot by the camera, another vehicle, an obstacle, or a human in front of the vehicle can be recognized.

Sensors for pose 270 include sensors that detect a pose, a behavior, or a position of the vehicle, and include, for example, an inertial measurement unit (IMU) or a global positioning system (GPS).

The IMU detects, for example, an acceleration in a front-rear direction, a lateral direction, and a vertical direction of the vehicle and an angular speed in a roll direction, a pitch direction, and a yaw direction of the vehicle. The GPS detects a position of vehicle 10 based on information received from a plurality of GPS satellites that orbit the Earth. Information obtained by sensors for pose 270 is outputted to compute assembly 210.

Sensor cleaning 290 is configured to remove soiling attached to various sensors during traveling of the vehicle. Sensor cleaning 290 removes soiling attached to a lens of the camera or a portion from which laser beams or radio waves are emitted, for example, with a cleaning solution or a wiper.

VCIB 111 includes a VCIB 111A and a VCIB 111B. Each of VCIBs 111A and 111B contains a central processing unit (CPU) and a memory (for example, a read only memory (ROM) and a random access memory (RAM)), neither of which is shown. Though VCIB 111A is equivalent in function to VCIB 111B, it is partially different in a plurality of systems connected to the VCIBs that make up VP 120.

VCIBs 111A and 111B are communicatively connected to communication modules 210A and 210B of compute assembly 210, respectively. VCIB 111A and VCIB 111B are communicatively connected to each other.

VCIBs 111A and 111B each relay various commands corresponding to control requests from ADS 202 and output them as control commands to a corresponding system of VP 120. More specifically, each of VCIB 111A and VCIB 111B uses various commands provided from ADS 202 based on information (for example, an API) such as a program stored in the memory to generate a control command to be used for control of a corresponding system of VP 120 and outputs the control command to the corresponding system. VCIBs 111A and 111B each relay vehicle information provided from each system of VP 120 and provide the vehicle information as a vehicle status to ADS 202. The information indicating the vehicle status may be information identical to the vehicle information or may be information extracted from the vehicle information to be used for processing performed by ADS 202.

As VCIBs 111A and 111B equivalent in function relating to an operation of at least one of (for example, braking or steering) systems are provided, control systems between ADS 202 and VP 120 are redundant. Thus, when some kind of failure occurs in a part of the system, the function (turning or stopping) of VP 120 can be maintained by switching between the control systems as appropriate or disconnection of a control system where failure has occurred.

Brake system 121 includes brake systems 121A and 121B. Steering system 122 includes steering systems 122A and 122B. Powertrain system 123 includes an EPB system 123A, a P-Lock system 123B, and a propulsion system 124.

VCIB 111A is communicatively connected to brake system 121A, steering system 122A, EPB system 123A, P-Lock system 123B, propulsion system 124, and body system 126 of the plurality of systems of VP 120 through a communication bus.

VCIB 111B is communicatively connected to brake system 121B, steering system 122B, and P-Lock 123 of the plurality of systems of VP 120 through a communication bus.

Brake systems 121A and 121B are configured to control a plurality of braking apparatuses provided in wheels of the vehicle. Brake system 121A may be equivalent in function to brake system 121B, or one of them may be configured to independently control braking force of each wheel during travel of the vehicle and the other thereof may be configured to control braking force such that equal braking force is generated in the wheels during travel of the vehicle.

Brake systems 121A and 121B generate braking commands to the braking apparatuses in accordance with a control request outputted from ADS 202 through VCIB 111A and VCIB 111B, respectively. For example, brake systems 121A and 121B control the braking apparatuses based on a braking command generated in one of the brake systems, and when a failure occurs in that brake system, the braking apparatuses are controlled based on a braking command generated in the other brake system.

Steering systems 122A and 122B are configured to control a steering angle of a steering wheel of vehicle 10 with a steering apparatus. Steering system 122A is similar in function to steering system 122B.

Steering systems 122A and 122B generate steering commands to the steering apparatus in accordance with a control request outputted from ADS 202 through VCIB 111A and VCIB 111B, respectively. For example, steering systems 122A and 122B control the steering apparatus based on the steering command generated in one of the steering systems, and when a failure occurs in that steering system, the steering apparatus is controlled based on a steering command generated in the other steering system.

EPB system 123A is configured to control the EPB. The EPB fixes a wheel by an operation of an actuator. The EPB, for example, activates with an actuator, a drum brake for a parking brake provided in at least one of a plurality of wheels provided in vehicle 10 to fix the wheel, or activates a braking apparatus to fix a wheel with an actuator capable of regulating a hydraulic pressure to be supplied to the braking apparatus separately from brake systems 121A and 121B.

EPB system 123A controls the EPB in accordance with a control request outputted from ADS 202 through VCIB 111A.

P-Lock system 123B is configured to control a P-Lock apparatus. The P-Lock apparatus fits a protrusion provided at a tip end of a parking lock pawl, a position of which is adjusted by an actuator, into a tooth of a gear (locking gear) provided as being coupled to a rotational element in the transmission of vehicle 10. Rotation of an output shaft of the transmission is thus fixed so that fixing of rotation of the wheel (which is also referred to as "fixing of wheels" below) of a drive wheel is carried out.

P-Lock system 123B controls the P-Lock apparatus in accordance with a control request provided from ADS 202 through VCIB 111A. For example, when the control request provided from ADS 202 through VCIB 111A includes a control request to set the shift range to a parking range (which is denoted as a P range below), P-Lock system 123B activates the P-Lock apparatus, and when the control request includes a control request to set the shift range to a shift range other than the P range, it deactivates the P-Lock apparatus.

Propulsion system 124 is configured to switch a shift range with the use of a shift apparatus and to control driving force of vehicle 10 in a direction of movement of vehicle 10 that is generated from a drive source. Switchable shift ranges include, for example, the P range, a neutral range (which is denoted as an N range below), a forward travel range (which is denoted as a D range below), and a rearward travel range (which is denoted as an R range below). The drive source includes, for example, a motor generator and an engine.

Propulsion system 124 controls the shift apparatus and the drive source in accordance with a control request provided from ADS 202 through VCIB 111A. For example, when a control request provided from ADS 202 through VCIB 111A includes a control request to set the shift range to the P range, propulsion system 124 controls the shift apparatus to set the shift range to the P range.

Active safety system 125 is communicatively connected to brake system 121A. As described above, active safety system 125 detects an obstacle (an obstacle or a human) in front by using camera 129A and radar sensor 129B, and when it determines that there is possibility of collision based on a distance to the obstacle, it outputs a braking command to brake system 121A so as to increase braking force.

Body system 126 controls components such as a direction indicator, a horn, or a wiper in accordance with a control request provided from ADS 202 through VCIB 111A.

An operation apparatus manually operable by a user for the braking apparatus, the steering apparatus, the EPB, the P-Lock apparatus, the shift apparatus, and the drive source described above may separately be provided.

Various commands corresponding to control requests provided from ADS 202 to VCIB 111 include a propulsion direction command requesting switching of the shift range, an immobilization command requesting activation or deactivation of the EPB and the P-Lock apparatus, an acceleration command requesting acceleration or deceleration of vehicle 10, a wheel steer angle command requesting a wheel steer angle of a steering wheel, an autonomization command requesting switching of an autonomous state between an autonomous mode and a manual mode, and a standstill command requesting keeping on stationary or keeping off stationary of the vehicle. For example, when an autonomous mode is selected as the autonomous state by an operation by the user onto HMI 230 in vehicle 10 configured as above, autonomous driving is carried out. During autonomous driving, ADS 202 initially creates a driving plan as described above. Examples of the driving plan include a plurality of plans relating to operations of vehicle 10 such as a plan to continue straight travel, a plan to turn left or right at a prescribed intersection on a predetermined travel path, and a plan to change a travel lane to a lane different from the lane where the vehicle currently travels.

ADS 202 extracts a controllable physical quantity (for example, an acceleration or a deceleration, and a wheel steer angle) necessary for operations of vehicle 10 in accordance with the created driving plan. ADS 202 splits the physical quantity for each execution cycle time of the API. ADS 202 executes the API with the use of the resultant physical quantity and outputs various commands to VCIB 111. Furthermore, ADS 202 obtains a vehicle status (for example, an actual direction of movement of vehicle 10 and a state of fixation of the vehicle) from VP 120 and creates again the driving plan on which the obtained vehicle status is reflected. ADS 202 thus allows autonomous driving of vehicle 10.

During autonomous driving of vehicle 10, a user does not perform an operation. Therefore, in parking of vehicle 10, rotation of wheels should be fixed with the use of the EPB and the P-Lock apparatus at appropriate timing.

In the present embodiment, it is assumed that operations as below are performed between ADS 202 and base vehicle 100 of VP 120 with VCIB 111 being interposed. Specifically, from ADS 202 to base vehicle 100, an immobilization command that requests immobilization of vehicle 10 (fixing of wheels) is transmitted through VCIB 111. From base vehicle 100 to ADS 202, a traveling direction (corresponding to a signal) indicating a standstill status of vehicle 10 is transmitted through VCIB 111. Then, when a first condition including a condition that vehicle 10 is in a standstill status is satisfied, ADS 202 transmits the immobilization command to base vehicle 100 through VCIB 111. Base vehicle 100 carries out immobilization of vehicle 10 in accordance with the received immobilization command.

Since the immobilization command is thus transmitted from ADS 202 to base vehicle 100 when the first condition including the condition that vehicle 10 is in the standstill status is satisfied, immobilization of vehicle 10 (that is, fixing of wheels) can be carried out at appropriate timing during autonomous driving.

Figure 3:
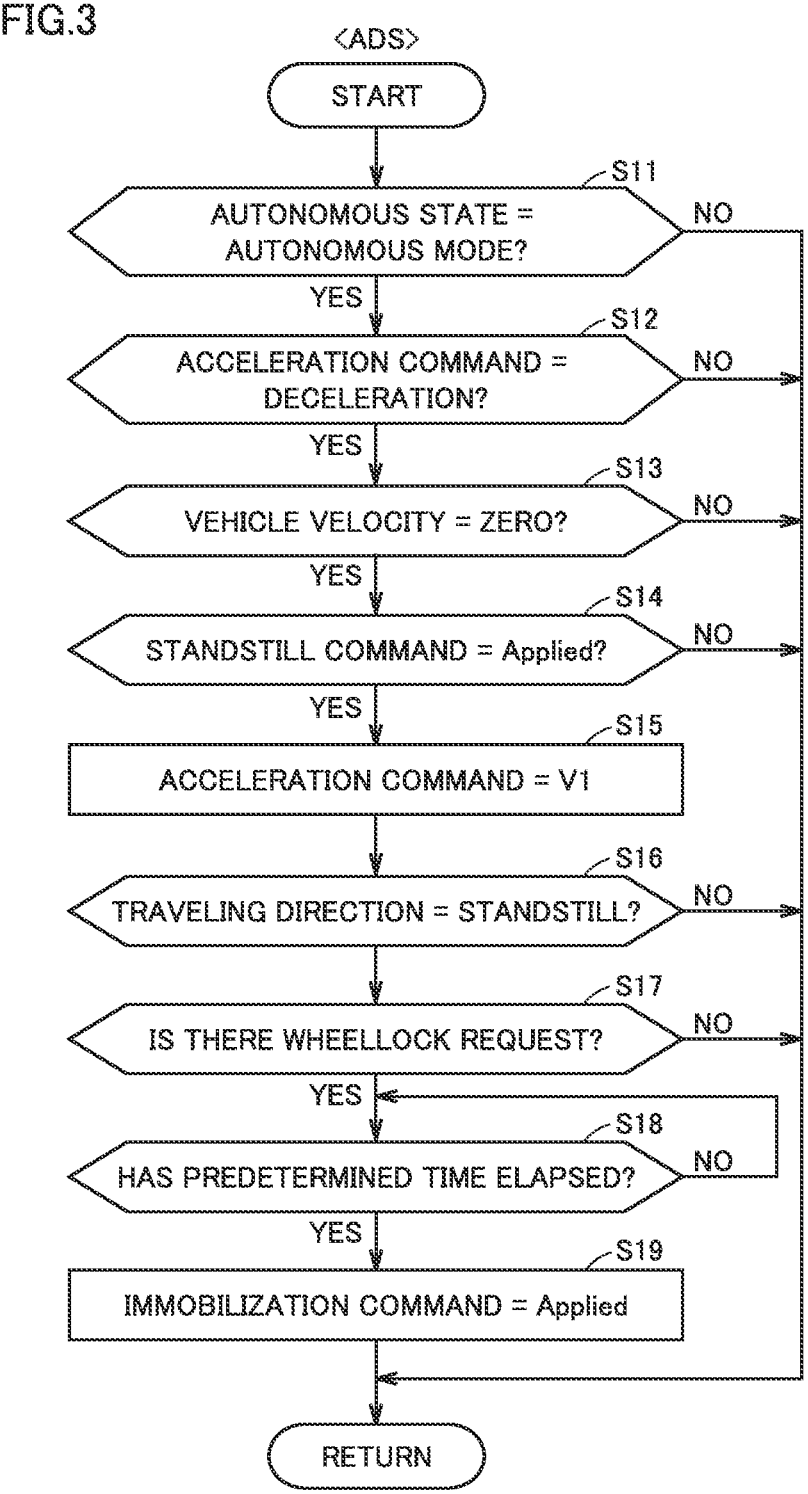
FIG. 3 is a flowchart showing exemplary processing performed in the ADS.

Processing performed by ADS 202 (more specifically, compute assembly 210) in the present embodiment will be described below with reference to FIG. 3. FIG. 3 is a flowchart showing exemplary processing performed in ADS 202. ADS 202 repeatedly performs processing as below, for example, every execution cycle time of the API.

In step (the step being denoted as S below) 11, ADS 202 determines whether or not an autonomous state has been set to an autonomous mode. ADS 202 determines whether or not the autonomous state has been set to the autonomous mode, for example, based on a status of a flag indicating the autonomous mode. The flag indicating the autonomous mode is turned on, for example, when an operation to carry out autonomous driving onto HMI 230 by the user is accepted, and turned off when the autonomous mode is canceled and switching to the manual mode is made in response to an operation by the user or in accordance with a condition of drive. When the autonomous state is determined as having been set to the autonomous mode (YES in S11), the process proceeds to S12.

In S12, ADS 202 determines whether or not an acceleration command has a value indicating deceleration. The acceleration command has an acceleration value or a deceleration value. For example, the acceleration command having a positive value indicates a request for acceleration of vehicle 10 from ADS 202 to VP 120. The acceleration command having a negative value indicates a request for deceleration of vehicle 10 from ADS 202 to VP 120. When the acceleration command has the negative value, ADS 202 determines that the acceleration command has a value indicating deceleration (that is, the acceleration command includes the deceleration value). When the acceleration command is determined as having the value indicating deceleration (YES in S12), the process proceeds to S13.

In S13, ADS 202 determines whether or not a vehicle velocity is zero. ADS 202 obtains information on the velocity of vehicle 10 as a vehicle status from VP 120. For example, information on a velocity of vehicle 10 (a velocity in a traveling direction of vehicle 10) calculated based on a wheel speed obtained by wheel speed sensor 127A or wheel speed sensor 127B of base vehicle 100 is provided as the vehicle status from base vehicle 100 through VCIB 111 to the ADS. When the vehicle velocity is determined as zero (YES in S13), the process proceeds to S14.

In S14, ADS 202 determines whether or not a standstill command has a value indicating "Applied". The standstill command is used, for example, for selecting whether or not a brakeholding function of the EPB or the P-Lock apparatus can be applied while the vehicle is in a standstill. When keeping on stationary of vehicle 10 is requested, the standstill command is set to a value indicating "Applied". When keeping off stationary of vehicle 10 is requested, the standstill command is set to a value indicating "Release". When neither keeping on stationary nor keeping off stationary of vehicle 10 is requested, the standstill command is set to a value indicating "No request." When the standstill command is determined as having a value indicating "Applied" (YES in S14), the process proceeds to S15.

In S15, ADS 202 sets V1 as the acceleration command. V1 represents a constant deceleration value. For example, V1 should only be a value on which restriction of movement of vehicle 10 can be based, and it is a predetermined value adapted through experiments or the like.

In S16, ADS 202 determines whether or not the traveling direction of vehicle 10 indicates the standstill status. ADS 202 obtains from VP 120, information on the traveling direction of vehicle 10 as the vehicle status. For example, when a state that the velocity of vehicle 10 (the velocity in the traveling direction of vehicle 10) is zero continues for a prescribed time period based on the wheel speed obtained by wheel speed sensor 127A or wheel speed sensor 127B of base vehicle 100, information indicating that the traveling direction indicates the standstill status is provided as the vehicle status from base vehicle 100 through VCIB 111 to ADS 202. When it is determined that the traveling direction of vehicle 10 indicates the standstill status (YES in S16), the process proceeds to S17.

In S17, ADS 202 determines whether or not there is a wheellock request. For example, when a created driving plan includes a plan to immobilize vehicle 10, ADS 202 determines that there is a wheellock request. When it is determined that there is a wheellock request (YES in S17), the process proceeds to S18.

In S18, ADS 202 determines whether or not predetermined time has elapsed since vehicle 10 came to the standstill. ADS 202 may determine, for example, whether or not predetermined time has elapsed since a time point when the traveling direction of vehicle 10 indicated the standstill status or whether or not predetermined time has elapsed since a time point when the vehicle velocity attained to zero. The predetermined time may be adapted, for example, through experiments or the like. When it is determined that the predetermined time has elapsed since vehicle 10 came to the standstill (YES in S18), the process proceeds to S19.

In S19, ADS 202 sets the immobilization command to the value indicating "Applied". In other words, VP 120 is requested to immobilize vehicle 10. Therefore, when the immobilization command is set to the value indicating "Applied", the EPB and the P-Lock apparatus in VP 120 are controlled to be activated as will be described later.

When the autonomous state has not been set to the autonomous mode (NO in S11), when the acceleration command does not have a value indicating the deceleration value (NO in S12), when the vehicle velocity is not zero (NO in S13), when the standstill command does not have a value indicating "Applied" (NO in S14), when the traveling direction of vehicle 10 does not indicate the standstill status (NO in S16), or when there is no wheellock request (NO in S17), this process ends. When predetermined time has not elapsed since vehicle 10 came to the standstill (NO in S18), the process returns to S18.

Figure 4:
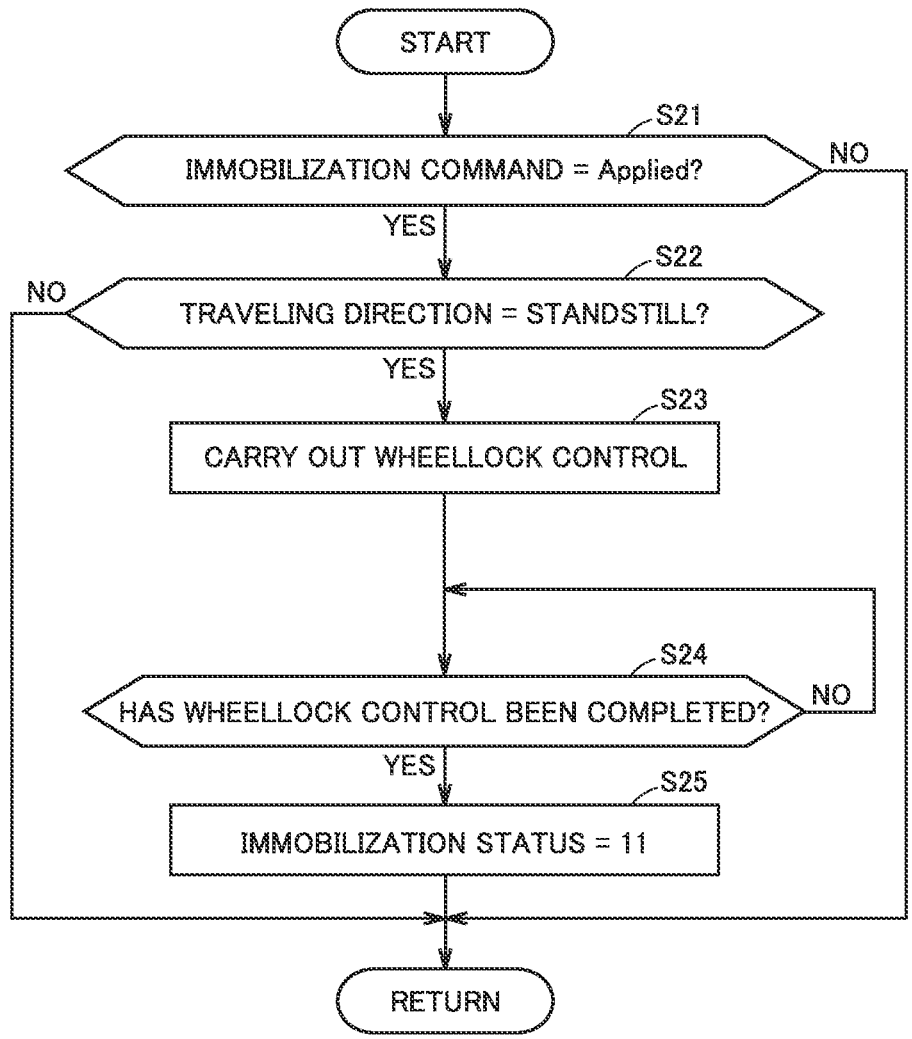
FIG. 4 is a flowchart showing exemplary processing performed in the VCIB.

Processing performed by VCIB 111 (more specifically, VCIB 111A) will now be described with reference to FIG. 4. FIG. 4 is a flowchart showing exemplary processing performed in VCIB 111. VCIB 111 repeatedly performs processing as below, for example, every execution cycle time of the API.

In S21, VCIB 111 determines whether or not the immobilization command has been set to the value indicating "Applied". When it is determined that the immobilization command has been set to the value indicating "Applied" (YES in S21), the process proceeds to S22.

In S22, VCIB 111 determines whether or not the traveling direction of vehicle 10 indicates the standstill status. When the traveling direction of vehicle 10 is determined as indicating the standstill status (YES in S22), the process proceeds to S23.

In S23, VCIB 111 carries out wheellock control. Specifically, VCIB 111 provides a control command that requests EPB system 123A to activate the EPB and provides a control command that requests P-Lock system 123B to activate the P-Lock apparatus (a control command that requests setting of the shift range to the P range).

In S24, VCIB 111 determines whether or not wheellock control has been completed. VCIB 111 determines that wheellock control has been completed when both of the EPB and the P-Lock apparatus have been activated.

For example, when prescribed time has elapsed since output of the control command that requests activation of the EPB, VCIB 111 may determine that the EPB is active, or when an amount of actuation by an actuator of the EPB exceeds a threshold value, VCIB 111 may determine that the EPB is active.

Similarly, for example, when prescribed time has elapsed since output of the control command that requests activation of the P-Lock apparatus, VCIB 111 may determine that the P-Lock apparatus is active, or when an amount of actuation by an actuator of the P-Lock apparatus exceeds a threshold value, VCIB 111 may determine that the P-Lock apparatus is active. When it is determined that wheellock control has been completed (YES in S24), the process proceeds to S25.

In S25, VCIB 111 sets "11" as an immobilization status. The value indicating the immobilization status being set to "11" indicates that both of the EPB and the P-Lock apparatus are active. VCIB 111 provides the set immobilization status as one of pieces of information included in the vehicle status to ADS 202. When the traveling direction of vehicle 10 is determined as not indicating the standstill status (NO in S22), this process ends.

When it is determined that the immobilization command has not been set to "Applied" (NO in S21), this process ends. When wheellock control is determined as not having been completed (NO in S24), the process returns to S24.

Figure 5:
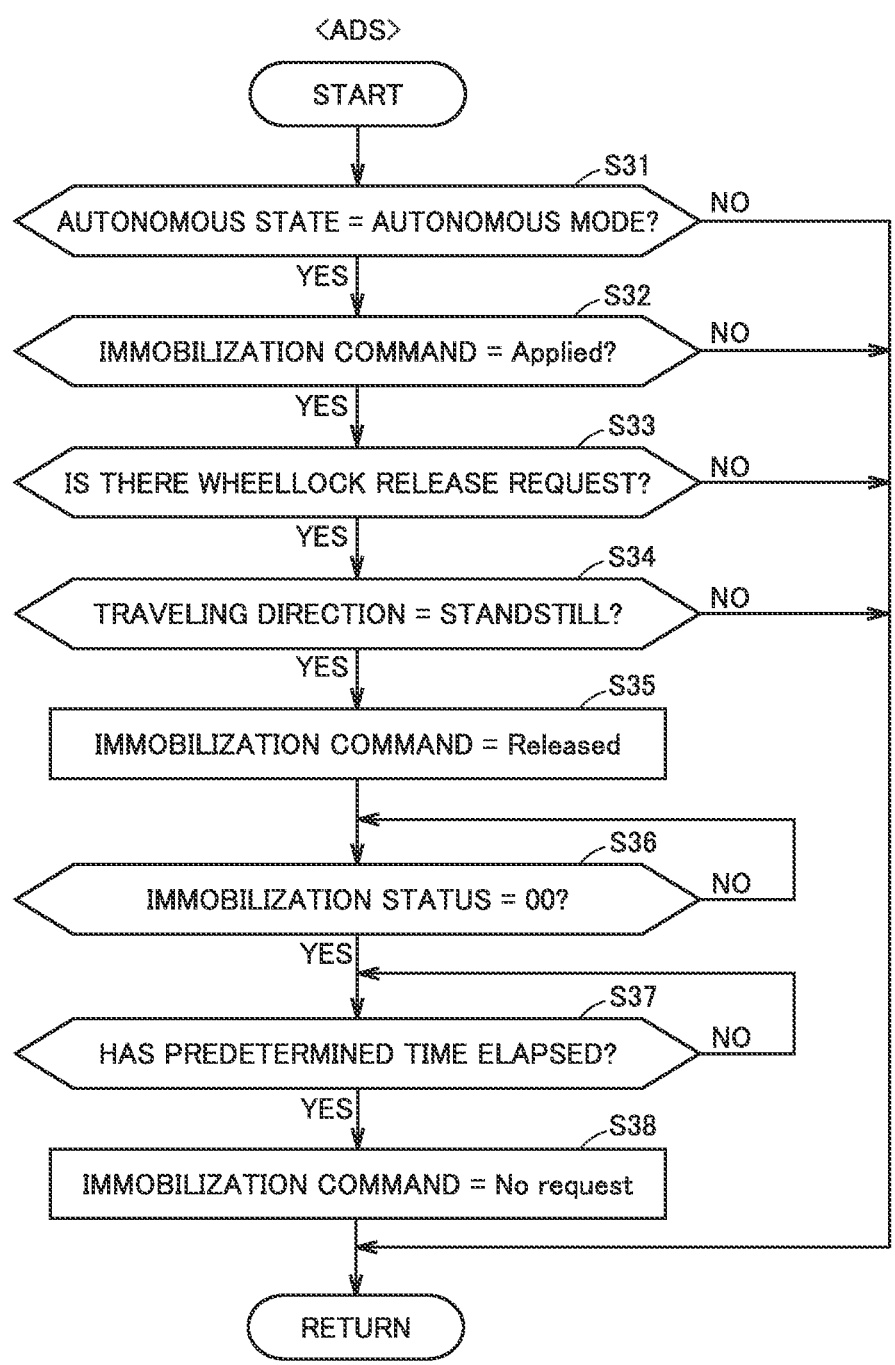
FIG. 5 is a flowchart showing exemplary processing performed in the ADS when immobilization of the vehicle has been requested.

Processing performed in ADS 202 when immobilization of vehicle 10 has been requested will now be described with reference to FIG. 5. FIG. 5 is a flowchart showing exemplary processing performed in ADS 202 when immobilization of vehicle 10 has been requested. ADS 202 repeatedly performs processing as below, for example, every execution cycle time of the API.

In S31, ADS 202 determines whether or not the autonomous state has been set to the autonomous mode. Since the method of determining whether or not the autonomous state has been set to the autonomous mode is as described above, detailed description thereof will not be repeated. When the autonomous state is determined as having been set to the autonomous mode (YES in S31), the process proceeds to S32.

In S32, ADS 202 determines whether or not the immobilization command has been set to the value indicating "Applied" (that is, immobilization of vehicle 10 has been requested). When the immobilization command is determined as having been set to the value indicating "Applied" (YES in S32), the process proceeds to S33.

In S33, ADS 202 determines whether or not there is a wheellock release request. For example, when a created driving plan includes a plan to have the vehicle travel, ADS 202 determines that there is a wheellock release request. When it is determined that there is a wheellock release request (YES in S33), the process proceeds to S34.

In S34, ADS 202 determines whether or not the traveling direction of vehicle 10 indicates the standstill status. Since the method of determining whether or not the traveling direction of vehicle 10 indicates the standstill status is as described above, detailed description thereof will not be repeated. When the traveling direction of vehicle 10 is determined as indicating the standstill status (YES in S34), the process proceeds to S35.

In S35, ADS 202 sets the immobilization command to a value indicating "Released". In other words, VP 120 is requested to release immobilization of vehicle 10. When the immobilization command is set to the value indicating "Released", both of the EPB and the P-Lock apparatus are controlled to be deactivated as will be described later.

In S36, ADS 202 determines whether or not the immobilization status has been set to "00". The immobilization status is provided as one of vehicle statuses from base vehicle 100 through VCIB 111.

The immobilization status is set by combining a value indicating a status of the EPB and a value indicating a status of the P-Lock apparatus with each other. The value indicating the status of the EPB being set to "1" indicates activation of the EPB. The value indicating the status of the EPB being set to "0" indicates deactivation of the EPB. Similarly, the value indicating the status of the P-Lock apparatus being set to "1" indicates activation of the P-Lock apparatus. The value indicating the status of the P-Lock apparatus being set to "0" indicates deactivation of the P-Lock apparatus. Therefore, for example, the value indicating the immobilization status being set to "11" indicates that both of the EPB and the P-Lock apparatus are active. The value indicating the immobilization status being set to "00" indicates that both of the EPB and the P-Lock apparatus are inactive. The value indicating the immobilization status being set to "10" indicates that the EPB is active whereas the P-Lock apparatus is inactive. The value indicating the immobilization status being set to "01" indicates that the EPB is inactive whereas the P-Lock apparatus is active. When the immobilization status is determined as having been set to "00" (YES in S36), the process proceeds to S37.

In S37, ADS 202 determines whether or not predetermined time has elapsed since the immobilization status was set to "00". When it is determined that predetermined time has elapsed since the immobilization status was set to "00" (YES in S37), the process proceeds to S38. When it is determined that predetermined time has not elapsed since the immobilization status was set to "00" (NO in S37), the process returns to S37.

In S38, ADS 202 sets the immobilization command to a value indicating "No request." The value of the immobilization command indicating "No request" indicates a state where neither immobilization nor release of immobilization of vehicle 10 is requested.

When the autonomous state has not been set to the autonomous mode (NO in S31), when the immobilization command has not been set to the value indicating "Applied" (NO in S32), when there is no wheellock release request (NO in S33), or when the traveling direction of vehicle 10 is determined as not indicating the standstill status (NO in S34), this process ends. When the immobilization status has not been set to "00" (NO in S36), the process returns to S36.

Figure 6:
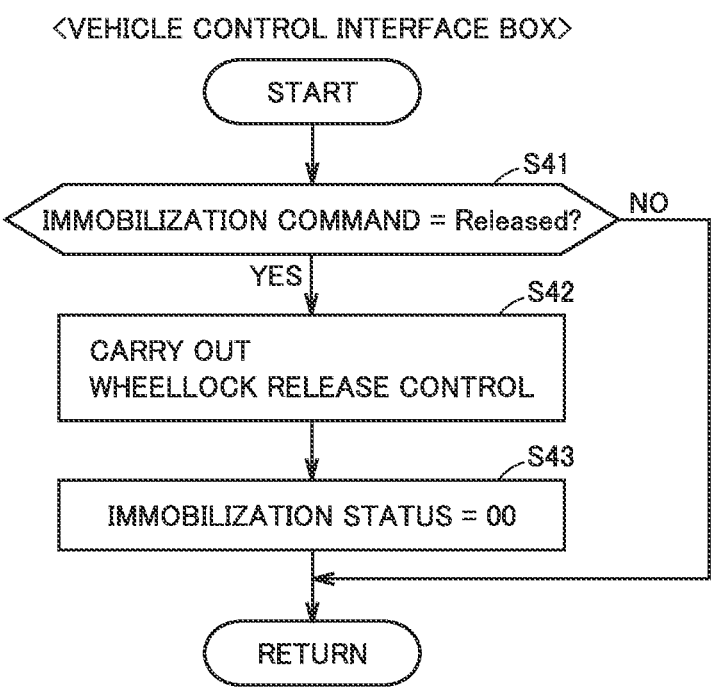
FIG. 6 is a flowchart showing exemplary processing performed in the VCIB when immobilization of the vehicle has been requested.

Processing performed by VCIB 111 (more specifically, VCIB 111A) when immobilization of vehicle 10 has been requested will now be described with reference to FIG. 6. FIG. 6 is a flowchart showing exemplary processing performed in VCIB 111 when immobilization of vehicle 10 has been requested. VCIB 111 repeatedly performs processing as below, for example, every execution cycle time of the API.

In S41, VCIB 111 determines whether or not the immobilization command has been set to "Released". When it is determined that the immobilization command has been set to "Released" (YES in S41), the process proceeds to S42.

In S42, VCIB 111 carries out wheellock release control. Specifically, VCIB 111 outputs a control command that requests EPB system 123A to deactivate the EPB and outputs a control command that requests P-Lock system 123B to deactivate the P-Lock apparatus (for example, a control command that requests setting of the shirt range to a non-P range (for example, the N range, the D range, or the R range)).

In S43, VCIB 111 sets the immobilization status to "00". The value indicating the immobilization status being set to "00" indicates that both of the EPB and the P-Lock apparatus are inactive. VCIB 111 provides the set immobilization status as one of pieces of information included in the vehicle status to ADS 202.

Figure 7:
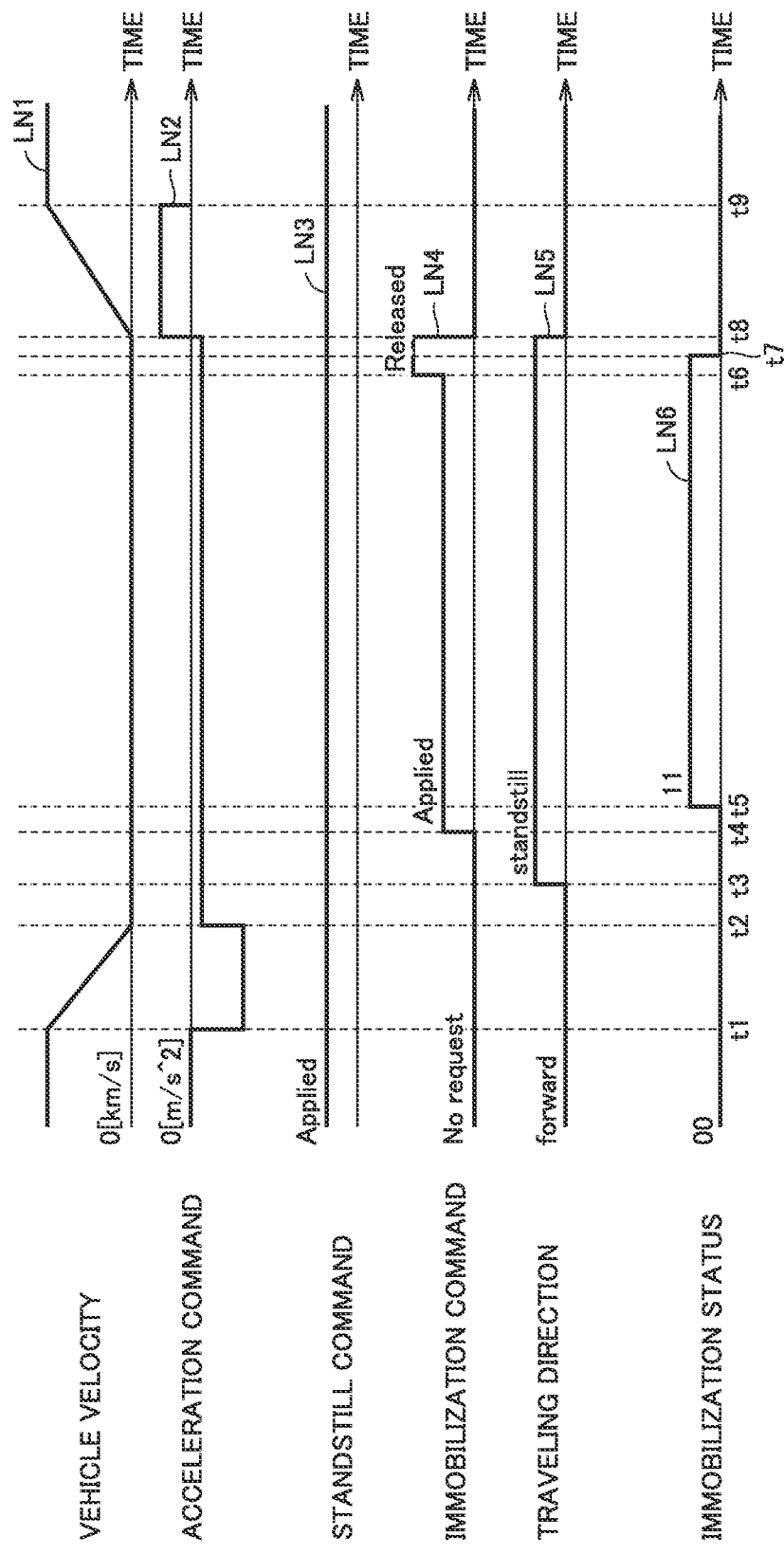
FIG. 7 is a timing chart for illustrating an operation of the ADS and the VP.

An operation of ADS 202 and VCIB 111 based on the structure and the flowchart as above will be described with reference to FIG. 7. FIG. 7 is a timing chart for illustrating an operation of ADS 202 and VP 120. The abscissa in FIG. 7 represents time. LN1 in FIG. 7 represents variation in velocity of vehicle 10. LN2 in FIG. 7 shows variation in acceleration command. LN3 in FIG. 7 represents variation in standstill command. LN4 in FIG. 7 represents variation in immobilization command. LN5 in FIG. 7 represents variation in traveling direction of vehicle 10. LN6 in FIG. 7 represents variation in immobilization status.

For example, it is assumed that vehicle 10 in autonomous driving is traveling at a constant velocity as shown with LN1 in FIG. 7. At this time, as shown with LN2 in FIG. 7, the value indicating the acceleration command is assumed as zero. As shown with LN3 in FIG. 7, the standstill command is assumed as being set to the value indicating "Applied". As shown with LN4 in FIG. 7, the immobilization command is assumed as being set to the value indicating "No request." As shown with LN5 in FIG. 7, the traveling direction of vehicle 10 is assumed as the forward direction. As shown with LN6 in FIG. 7, the immobilization status is assumed as being set to "00" and the EPB and the P-Lock apparatus are both assumed as being inactive.

As shown with LN2 in FIG. 7, when the driving plan created in ADS 202 includes a deceleration plan, the acceleration command attains to the value indicating deceleration in accordance with the driving plan at time t1. Therefore, after time t1, the velocity of vehicle 10 decreases as shown with LN1 in FIG. 7.

When the autonomous state has been set to the autonomous mode (YES in S11) and the acceleration command has the value indicating deceleration (YES in S12), whether or not the traveling direction of vehicle 10 indicates the standstill status is determined (S13).

As shown with LN1 in FIG. 7, when the velocity of vehicle 10 attains to zero at time t2 (YES in S13), the standstill command has the value indicating "Applied" as shown with LN3 in FIG. 7 (YES in S14) and hence constant deceleration value V1 is set as the acceleration command as shown with LN2 in FIG. 7 (S15).

When a state that the velocity of vehicle 10 is zero continues for a prescribed time period, the traveling direction of vehicle 10 indicates the standstill status at time t3 as shown with LN5 in FIG. 7 (YES in S16) and hence whether or not there is a wheellock request is determined (S17). When there is a wheellock request (YES in S17), whether or not predetermined time has elapsed since vehicle 10 came to the standstill is determined (S18).

When it is determined that predetermined time has elapsed since vehicle 10 came to the standstill at time t4 (YES in S18), the immobilization command is set to the value indicating "Applied" as shown with LN4 in FIG. 7 (S19).

When the immobilization command has been set to "Applied" (YES in S21) and when the traveling direction of vehicle 10 indicates the standstill status (YES in S22), wheellock control is carried out and immobilization of vehicle 10 is carried out (S23). The EPB and the P-Lock apparatus of base vehicle 100 are thus both controlled to be activated. When wheellock control is completed by activation of both of the EPB and the P-Lock apparatus (YES in S24), the immobilization status is set to the value "11" at time t5 as shown with LN6 in FIG. 7 (S25).

When the autonomous state has been set to the autonomous mode (YES in S31) and the immobilization command has been set to "Applied" as shown with LN4 in FIG. 7 (YES in S32), whether or not there is a wheellock release request is determined (S33).

When the driving plan created in ADS 202 includes a plan to release immobilization of vehicle 10, wheellock release is requested in accordance with the driving plan at time t6 (YES in S33). Therefore, since the traveling direction of vehicle 10 indicates the standstill status as shown with LN5 in FIG. 7 (YES in S34), the immobilization command is set to "Released" as shown with LN4 in FIG. 7 (S35).

When the immobilization command is set to "Released" (YES in S41), wheellock release control is carried out and immobilization of vehicle 10 is released (S42). Therefore, both of the EPB and the P-Lock apparatus of base vehicle 100 are controlled to be deactivated and the immobilization status is set to "00" at time t7 as shown with LN6 in FIG. 7 (S43).

When the immobilization status is set to "00" at time t7 (YES in S36), whether or not predetermined time has elapsed since the immobilization status was set to "00" is determined (S37).

When it is determined that predetermined time has elapsed since the immobilization status was set to "00" at time t8 (YES in S37), the immobilization command is set to the value indicating "No request" as shown with LN4 in FIG. 7 (S38).

As set forth above, according to vehicle 10 in the present embodiment, when the first condition including the condition that the vehicle is in the standstill status is satisfied, the immobilization command including the value indicating "Applied" is transmitted from ADS 202 through VCIB 111 to base vehicle 100. Therefore, immobilization of vehicle 10 (that is, fixing of wheels) can be carried out at appropriate timing during autonomous driving. Therefore, a vehicle on which an autonomous driving system is mountable, a method of controlling a vehicle, and a vehicle control interface box that allow fixing of rotation of wheels at appropriate timing during autonomous driving can be provided.

When the immobilization command requests release of immobilization of vehicle 10 and when the second condition including the condition that vehicle 10 is in the standstill status is satisfied, the immobilization command including the value indicating "Released" is transmitted from ADS 202 through VCIB 111 to base vehicle 100. In base vehicle 100, immobilization of vehicle 10 is released in response to the immobilization command, and hence immobilization can be released at appropriate timing during autonomous driving.

Since the first condition described above further includes the condition that predetermined time has elapsed since vehicle 10 came to the standstill, immobilization of the vehicle can be carried out at appropriate timing during autonomous driving.

When the immobilization command requests immobilization of vehicle 10, the acceleration command including a constant deceleration value is transmitted from ADS 202 through VCIB 111 to base vehicle 100 during a period from the standstill of vehicle 10 until issuance of the request for release of immobilization of vehicle 10. Therefore, movement of vehicle 10 during the period from the standstill of vehicle 10 until release of immobilization of vehicle 10 can be restricted.

By giving and receiving various commands such as an acceleration command or an immobilization command and the vehicle status such as the traveling direction of vehicle 10 between ADS 202 and base vehicle 100 through VCIB 111, fixing of the wheels with the use of the EPB and the P-Lock apparatus when vehicle 10 comes to the standstill can be carried out at appropriate timing.

A modification will be described below.

Though VCIB 111 is described as performing the process shown in the flowchart in FIG. 4 and the process shown in the flowchart in FIG. 6 in the embodiment above, for example, VCIB 111A and VCIB 111B may perform the process described above in coordination.

Though VCIB 111 is described as performing the process shown in the flowchart in FIG. 4 and the process shown in the flowchart in FIG. 6 in the embodiment above, for example, a part or the entirety of the process described above may be performed by each system (specifically, EPB system 123A and P-Lock system 123B) to be controlled in base vehicle 100.

Though VCIB 111 is described as carrying out wheellock control (S23) when the immobilization command has the value indicating "Applied" (YES in S21) and when the traveling direction of vehicle 10 indicates the standstill status (YES in S22) in the embodiment above, the immobilization command may be discarded, for example, when the traveling direction of vehicle 10 does not indicate the standstill status (NO in S22) even when the immobilization command has the value indicating "Applied" (YES in S21). Specifically, VCIB 111 may discard the immobilization command by not carrying out wheellock control even when the immobilization command has been set to "Applied". At this time, VCIB 111 may provide information indicating that wheellock control is not carried out to ADS 202.

Thus, when the request for immobilization of vehicle 10 is issued by using the immobilization command during travel of vehicle 10, the request is discarded. Therefore, immobilization (that is, wheellock control) of vehicle 10 during travel of vehicle 10 can be suppressed.

According to the description in the embodiment above, when ADS 202 determines that predetermined time has elapsed since vehicle 10 came to the standstill (YES in S16), ADS 202 sets the immobilization command to the value indicating "Applied" so that wheellock control is carried out after predetermined time has elapsed since vehicle 10 came to the standstill. An entity that delays wheellock control, however, is not limited to ADS 202. For example, when the traveling direction of vehicle 10 indicates the standstill status, ADS 202 may set the immobilization command to the value indicating "Applied", and VCIB 111 may carry out wheellock control after predetermined time has elapsed since the time point when the immobilization command was set to the value indicating "Applied". Wheellock control can thus be carried out after predetermined time has elapsed since vehicle 10 came to the standstill.

The entirety or a part of the modification may be carried out as being combined as appropriate.

EXAMPLE

API Specification for TOYOTA Vehicle Platform

Ver. 1.1

Records of Revision

| Date of Revision | ver. | Overview of Revision | Reviser |
| --- | --- | --- | --- |
| 2020 May 23 | 1.0 | Creating a new material | TOYOTA MOTOR Corp. |
| 2021 Apr. 14 | 1.1 | The figure of Front Wheel Steer Angle Rate Limitation is updated. Explanation of Standstill Status is added. | TOYOTA MOTOR Corp. |

Table of Contents

1. Introduction
    1.1. Purpose of this Specification
    1.2. Target Vehicle
    1.3. Definition of Term
2. Structure
    2.1. Overall Structure of Autono-MaaS Vehicle
    2.2. System Structure of Autono-MaaS Vehicle
3. Application Interfaces
    3.1. Typical Usage of APIs
    3.2. APIs for Vehicle Motion Control
        3.2.1. API List for Vehicle Motion Control
        3.2.2. Details of Each API for Vehicle Motion Control
    3.3. APIs for BODY Control
        3.3.1. API List for BODY Control
        3.3.2. Details of Each API for BODY Control
    3.4. APIs for Power Control
        3.4.1. API List for Power Control
        3.4.2. Details of Each API for Power Control
    3.5. APIs for Failure Notification
        3.5.1. API List for Failure Notification
        3.5.2. Details of Each API for Failure Notification
    3.6. APIs for Security
        3.6.1. API List for Security
        3.6.2. Details of Each API for Security
4. API Guides to Control Toyota Vehicles
    4.1. APIs for Vehicle Motion Control
        4.1.1. API List for Vehicle Motion Control
        4.1.2. API Guides in Details for Vehicle Motion Control
    4.2. APIs for BODY Control
        4.2.1. API List for Power Control
    4.3. APIs for Power Control
        4.3.1. API List for Power Control
    4.4. APIs for Failure Notification
        4.4.1. API List for Failure Notification
    4.5. APIs for Security
        4.5.1. API List for Security
        4.5.2. API Guides in Details for Security

1. INTRODUCTION 1.1. Purpose of this Specification

This document is an API specification of vehicle control interface for Autono-MaaS vehicles and contains outline, the way to use and note of APIs.

1.2. Target Vehicle

This specification is applied to the Autono-MaaS vehicles defined by [Architecture Specification for TOYOTA Vehicle Platform attached with Automated Driving System].

1.3. Definition of Term

TABLE 1

Definition of Term

| Term | Definition |
|---|---|
| ADS | Autonomous Driving System |
| ADK | Autonomous Driving Kit |
| VP | Vehicle Platform |
| VCIB | Vehicle Control Interface Box. This is an ECU for the interface and the signal converter between ADS and VP's sub systems. |
| PCS | Pre-Collision Safety |

2. STRUCTURE

2.1. Overall Structure of Autono-MaaS Vehicle

Figure 8:
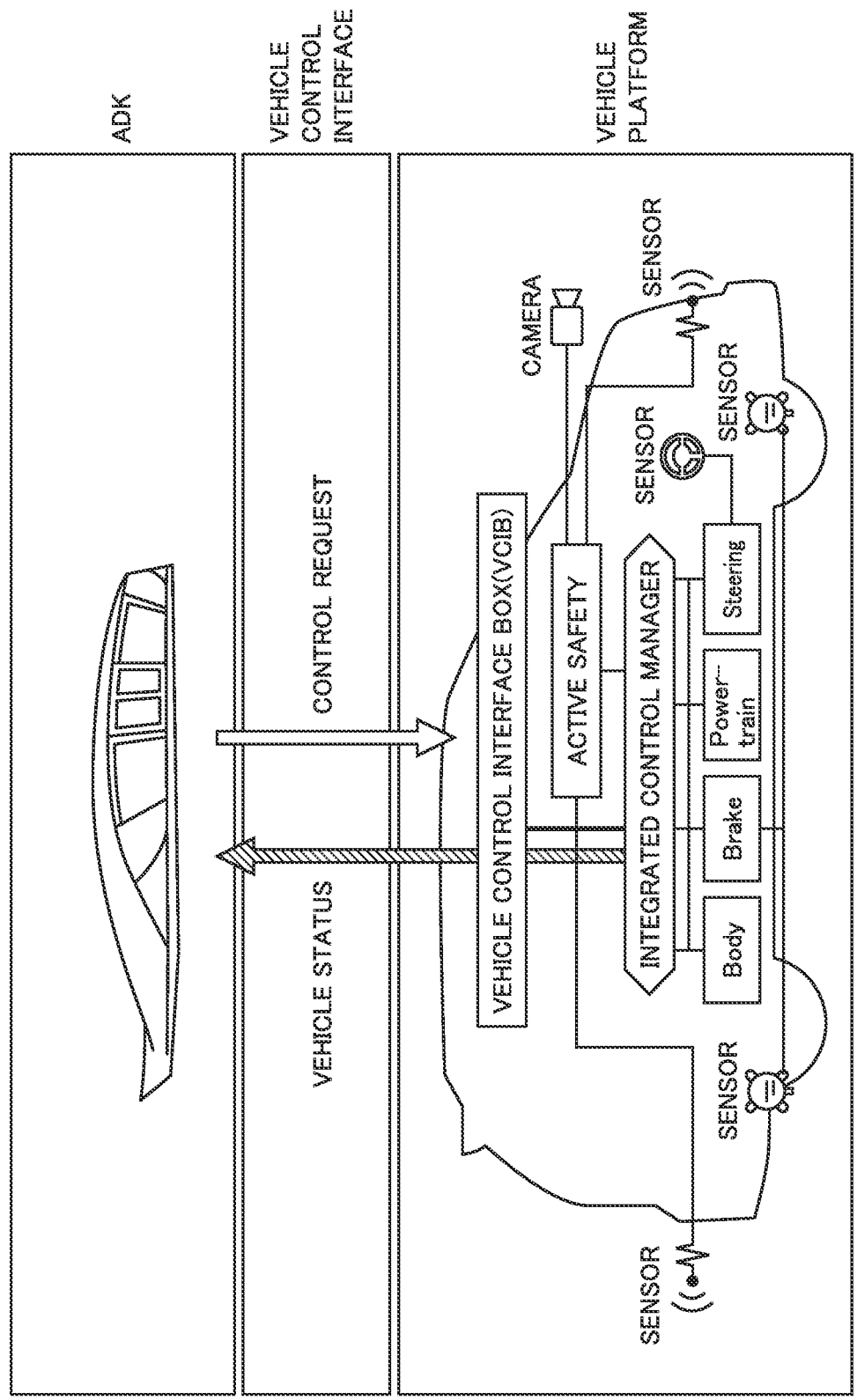
FIG. 8 is a diagram showing an overall structure of an Autono-MaaS vehicle.

The overall structure of Autono-MaaS is shown (FIG. 8).

2.2. System Structure of Autono-MaaS Vehicle

Figure 9:
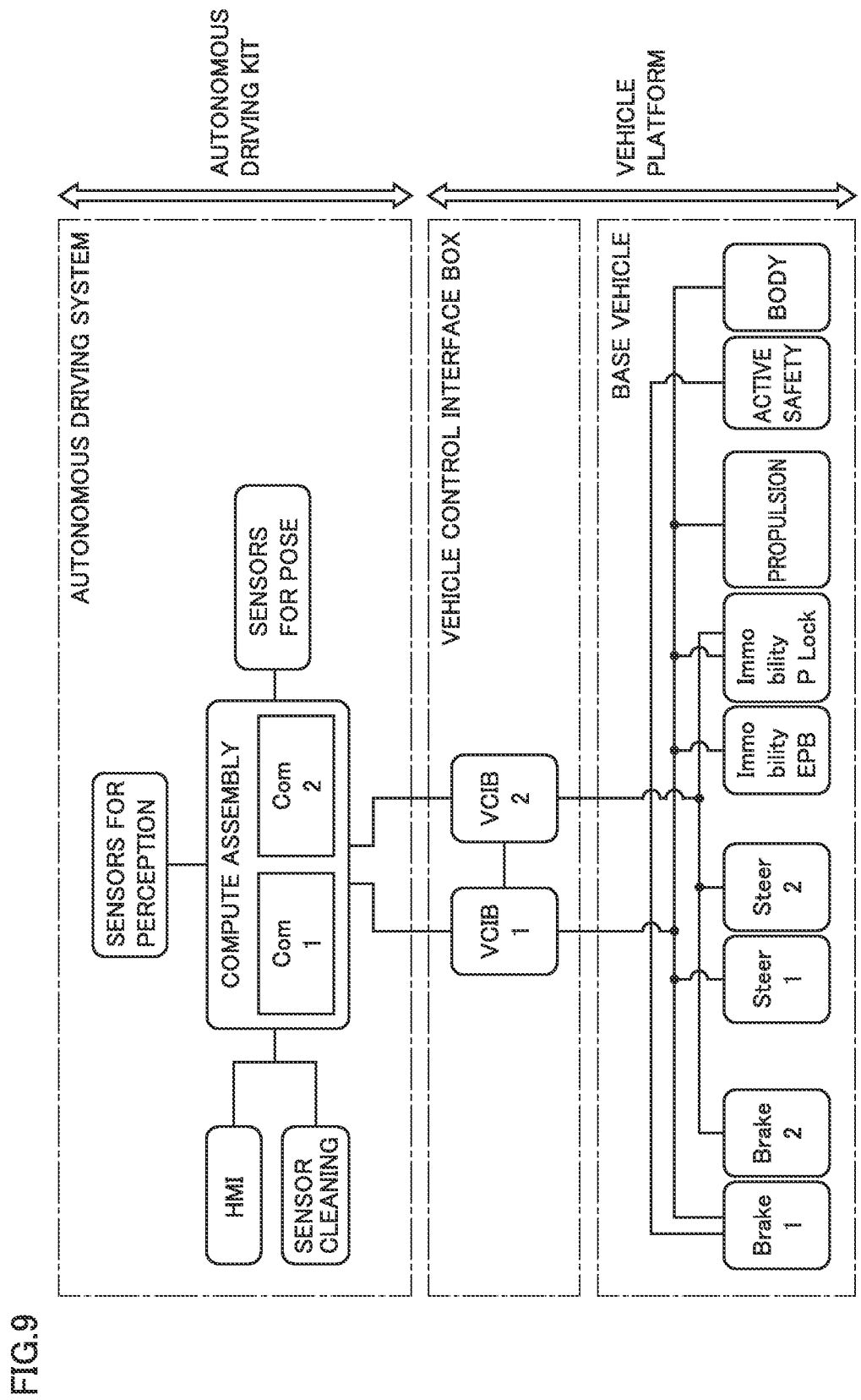
FIG. 9 is a diagram showing a system architecture of the Autono-MaaS vehicle.

System Architecture is shown in FIG. 9.

3. APPLICATION INTERFACES

3.1. Typical Usage of APIs

In this section, Typical Usage of APIs is described.
A typical workflow of APIs is as follows (FIG. 10). The following example assumes CAN for physical communication.

3.2. APIs for Vehicle Motion Control

In this section, the APIs for vehicle motion control are described.

3.2.1. API List for Vehicle Motion Control
3.2.1.1. Inputs

TABLE 3

Input APIs for vehicle motion control

| Signal Name | Description | Redundancy |
|---|---|---|
| Propulsion Direction Command | Request for shift change from/to forward (D range) to/from back (R range) | N/A |
| Immobilization Command | Request for turning on/off WheelLock | Applied |
| Standstill Command | Request for keeping on/off stationary | Applied |
| Acceleration Command | Request for acceleration/deceleration | Applied |
| Front Wheel Steer Angle Command | Request for front wheel steer angle | Applied |
| Vehicle Mode Command | Request for changing from/to manual mode to/from Autonomous Mode | Applied |
| High Dynamics Command | Request for increasing braking response performance* | Applied |

*Reaction time in VP upon a request from ADK

3.2.1.2. Outputs

TABLE 4

Output APIs for vehicle motion control

| Signal Name | Description | Redundancy |
|---|---|---|
| Propulsion Direction Status | Current shift status | N/A |
| Immobilization Status | Status of immobilization (i.e. EPB and Shift P) | Applied |
| Standstill Status | Standstill status | N/A |
| Estimated Gliding Acceleration | Estimated vehicle acceleration/deceleration when throttle is fully closed | N/A |
| Estimated maximum acceleration | Estimated maximum acceleration | Applied |
| Estimated maximum deceleration | Estimated maximum deceleration | Applied |
| Front wheel steer angle | Front wheel steer angle | Applied |
| Front wheel steer angle rate | Front wheel steer angle rate | Applied |
| Front wheel steer angle rate limitation | Road wheel angle rate limit | Applied |
| Estimated maximum lateral acceleration | Estimated max lateral acceleration | Applied |
| Estimated maximum lateral acceleration rate | Estimated max lateral acceleration rate | Applied |
| Intervention of accelerator pedal | This signal shows whether the accelerator pedal is depressed by a driver (intervention) | N/A |
| Intervention of brake pedal | This signal shows whether the brake pedal is depressed by a driver (intervention) | N/A |
| Intervention of steering wheel | This signal shows whether the steering wheel is turned by a driver (intervention) | N/A |
| Intervention of shift lever | This signal shows whether the shift lever is controlled by a driver (intervention) | N/A |
| Wheel speed pulse (front left) | Pulse from wheel speed sensor (Front Left Wheel) | N/A |
| Wheel rotation direction (front left) | Rotation direction of wheel (Front Left) | N/A |
| Wheel speed pulse (front right) | Pulse from wheel speed sensor (Front Right Wheel) | N/A |
| Wheel rotation direction (front right) | Rotation direction of wheel (Front Right) | N/A |
| Wheel speed pulse (rear left) | Pulse from wheel speed sensor (Rear Left Wheel) | Applied |
| Wheel rotation direction (Rear left) | Rotation direction of wheel (Rear Left) | Applied |
| Wheel speed pulse (rear right) | Pulse from wheel speed sensor (Rear Right Wheel) | Applied |
| Wheel rotation direction (Rear right) | Rotation direction of wheel (Rear Right) | Applied |
| Traveling direction | Moving direction of vehicle | Applied |

TABLE 4-continued

Output APIs for vehicle motion control

| Signal Name | Description | Redundancy |
| --- | --- | --- |
| Vehicle velocity | Estimated longitudinal velocity of vehicle | Applied |
| Longitudinal acceleration | Estimated longitudinal acceleration of vehicle | Applied |
| Lateral acceleration | Sensor value of lateral acceleration of vehicle | Applied |
| Yawrate | Sensor value of yaw rate | Applied |
| Slipping Detection | Detection of tire glide/spin/skid | Applied |
| Vehicle mode state | State of whether Autonomous Mode, manual mode | Applied |
| Readiness for autonomization | Situation of whether the vehicle can transition to Autonomous Mode or not | Applied |
| Failure status of VP functions for Autonomous Mode | This signal is used to show whether VP functions have some failures mode when a vehicle works as Autonomous Mode. | Applied |
| PCS Alert Status | Status of PCS (Alert) | N/A |
| PCS Preparation Status | Status of PCS (Prefill) | N/A |
| PCS Brake/PCS Brake Hold Status | Status of PCS (PB/PBH) | N/A |
| ADS/PCS arbitration status | ADS/PCS arbitration status | N/A |

3.2.2. Details of Each API for Vehicle Motion Control 3.2.2.1. Propulsion Direction Command Request for shift change from/to forward (D range) to/from back (R range)

Values

| Value | Description | Remarks |
| --- | --- | --- |
| 0 | No Request | |
| 2 | R | Shift to R range |
| 4 | D | Shift to D range |
| other | Reserved | |

Remarks

Available only when Vehicle mode state="Autonomous Mode."

Available only when a vehicle is stationary (Traveling direction="standstill").

Available only when brake is applied.

3.2.2.2. Immobilization Command

Request for turning on/off WheelLock

Values

The following table shows a case where EPB and Shift P are used for immobilization.

| Value | Description | Remarks |
| --- | --- | --- |
| 0 | No Request | |
| 1 | Applied | EPB is turned on and shift position is changed to "P" |
| 2 | Released | EPB is turned off and shift position is changed to the value of Propulsion Direction Command |

Remarks

This API is used for parking a vehicle.

Available only when Vehicle mode state="Autonomous Mode."

Changeable only when the vehicle is stationary (Traveling direction="standstill")

Changeable only while brake is applied.

3.2.2.3. Standstill Command

Request for applying/releasing brake holding function

Values

| Value | Description | Remarks |
| --- | --- | --- |
| 0 | No Request | |
| 1 | Applied | Brake holding function is allowed. |
| 2 | Released | |

Remarks

This API is used for choosing a status of whether the brake holding function is allowed.

Available only when Vehicle mode state="Autonomous Mode."

Acceleration Command (deceleration request) has to be continued until Standstill Status becomes "Applied".

3.2.2.4. Acceleration Command

Request for acceleration

Values

Estimated maximum deceleration to Estimated maximum acceleration [m/s$^2$]

Remarks

Available only when Vehicle mode state="Autonomous Mode."

Acceleration (+) and deceleration (−) request based on Propulsion Direction Status direction.

The upper/lower limit will vary based on Estimated maximum deceleration and Estimated maximum acceleration.

When acceleration more than Estimated maximum acceleration is requested, the request is set to Estimated maximum acceleration.

When deceleration more than Estimated maximum deceleration is requested, the request is set to Estimated maximum deceleration.

In case where a driver operates a vehicle (over-ride), the requested acceleration may not be achieved.

When PCS simultaneously works, VP should choose minimum acceleration (maximum deceleration).

3.2.2.5. Front Wheel Steer Angle Command

Values

| Value | Description | Remarks |
| --- | --- | --- |
| — | [unit: rad] | |

Remarks

Available only when Vehicle mode state="Autonomous Mode"

Left is positive value (+). Right is negative value (−).

Front wheel steer angle is set to value (0) when the vehicle is going straight.

This request is set as a relative value from the current one to prevent misalignment of "Front Wheel Steer Angle" from being accumulated.

The request value should be set within Front wheel steer angle rate limitation.

In case where a driver operates a vehicle (over-ride), the requested Front Wheel Steer Angle may not be achieved.

3.2.2.6. Vehicle Mode Command

Request for changing from/to manual mode to/from Autonomous Mode

| Value | Description | Remarks |
|---|---|---|
| 0 | No Request | |
| 1 | Request For Autonomy | |
| 2 | Deactivation Request | means transition request to manual mode |

Remarks

N/A 3.2.2.7. High Dynamics Command

If ADK would like to increase braking response performance* of VP, High Dynamics Command should be set to "High".

*Reaction time in VP upon a request from ADK

Values

| Value | Description | Remarks |
|---|---|---|
| 0 | No Request | |
| 1 | High | |
| 2-3 | Reserved | |

Remarks

N/A 3.2.2.8. Propulsion Direction Status

Current shift Status

| Value | Description | Remarks |
|---|---|---|
| 0 | Reserved | |
| 1 | P | |
| 2 | R | |
| 3 | N | |
| 4 | D | |
| 5 | Reserved | |
| 6 | Invalid value | |

Remarks if VP does not know the current shift status, this output is set to "Invalid Value."

3.2.2.9. Immobilization Status

Each immobilization system status

Values

The following table shows a case where EPB and Shift P are used for immobilization.

| Value | | | |
|---|---|---|---|
| Shift | EPB | Description | Remarks |
| 0 | 0 | Shift set to other than P, and EPB Released | |
| 1 | 0 | Shift set to P and EPB Released | |
| 0 | 1 | Shift set to other than P, and EPB applied | |
| 1 | 1 | Shift set to P and EPB Applied | |

Remarks

N/A 3.2.2.10. Standstill Status

Status of Standstill

| Value | Description | Remarks |
|---|---|---|
| 0 | Released | |
| 1 | Applied | |
| 2 | Reserved | |
| 3 | Invalid value | |

Remarks

N/A 3.2.2.11. Estimated Gliding Acceleration

Acceleration calculated in VP in case that throttle is closed, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.12. Estimated Maximum Acceleration

Acceleration calculated in VP in case that throttle is fully open, considering slope, road load and etc.

Values

[unit: m/s$^2$]

Remarks

When the Propulsion Direction Status is "D", acceleration for forward direction shows a positive value.

When the Propulsion Direction Status is "R", acceleration for reverse direction shows a positive value.

3.2.2.13. Estimated Maximum Deceleration

Maximum deceleration calculated in VP in case that brake in VP is requested as maximum, considering slope, road load and etc.

Values

[unit: m/s$^2$]

Remarks

When the Propulsion Direction Status is "D", deceleration for forward direction shows a negative value.

When the Propulsion Direction Status is "R", deceleration for reverse direction shows a negative value.

3.2.2.14. Front Wheel Steer Angle

Values

| Value | Description | Remarks |
|---|---|---|
| Minimum Value | Invalid value | |
| others | [unit: rad] | |

Remarks

Left is positive value (+). Right is negative value (−).

This signal should show invalid value until VP can calculate correct value or when the sensor is invalid/failed.

3.2.2.15. Front Wheel Steer Angle Rate
Front wheel steer angle rate
Values

| Value | Description | Remarks |
|---|---|---|
| Minimum Value | Invalid value | |
| others | [unit: rad/s] | |

Remarks
Left is positive value (+). Right is negative value (−).
This signal should show invalid value until VP can calculate correct value or when Front wheel steer angle shows the minimum value.

Figure 11:
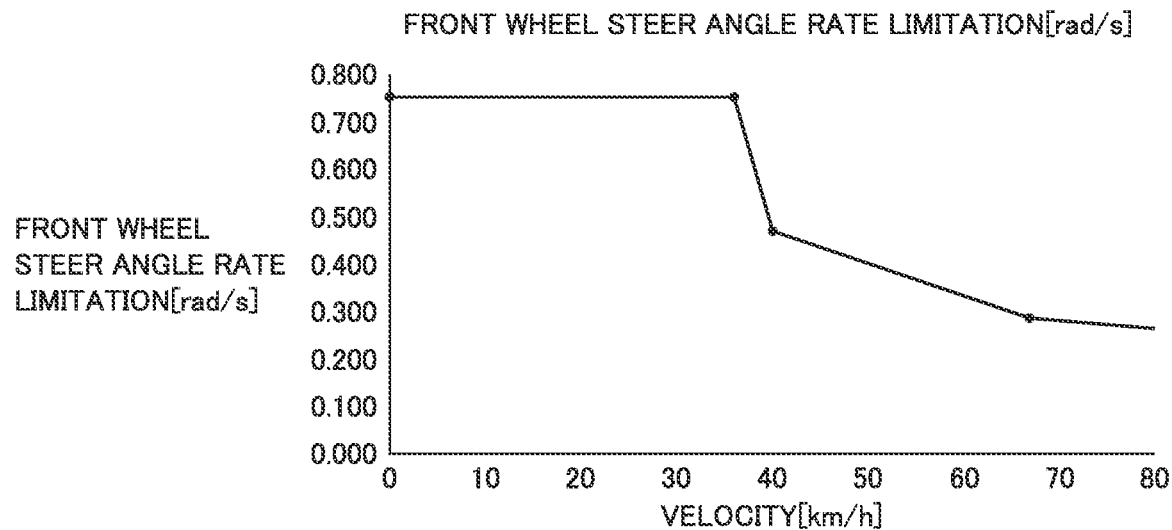
FIG. 11 is a diagram showing relation between a front wheel steer angle rate limitation and a velocity.

3.2.2.16. Front Wheel Steer Angle Rate Limitation
The limit of the Front wheel steer angle rate
Values
[unit: rad/s]
Remarks
The limitation is calculated from the "vehicle speed—steering angle rate" map as shown in following Table 5 and FIG. 11.
A) At a low speed or stopped situation, use fixed value (0.751 [rad/s]).
B) At a higher speed, the steering angle rate is calculated from the vehicle speed using 3.432 m/s$^3$.

TABLE 5

"vehicle speed - steering angle rate" map

| Velocity [km/h] | 0.0 | 36.0 | 40.0 | 67.0 | 84.0 |
|---|---|---|---|---|---|
| Front Wheel Steer Angle Rate Limitation [rad/s] | 0.751 | 0.751 | 0.469 | 0.287 | 0.253 |

3.2.2.17. Estimated Maximum Lateral Acceleration
Values
[unit: m/s$^2$] (fixed value: 3.432)
Remarks
Maximum lateral acceleration defined for VP.

3.2.2.18. Estimated Maximum Lateral Acceleration Rate
Values
[unit: m/s$^3$] (fixed value: 3.432)
Remarks
Maximum lateral acceleration rate defined for VP.

3.2.2.19. Intervention of Accelerator Pedal
This signal shows whether the accelerator pedal is depressed by a driver (intervention).
Values

| Value | Description | Remarks |
|---|---|---|
| 0 | Not depressed | |
| 1 | depressed | |
| 2 | Beyond autonomy acceleration | |

Remarks
When a position of accelerator pedal is higher than a defined threshold, this signal is set to "depressed".
When the requested acceleration calculated from a position of accelerator pedal is higher than the requested acceleration from ADS, this signal is set as "Beyond autonomy acceleration."

3.2.2.20. Intervention of Brake Pedal
This signal shows whether the brake pedal is depressed by a driver (intervention).
Values

| Value | Description | Remarks |
|---|---|---|
| 0 | Not depressed | |
| 1 | depressed | |
| 2 | Beyond autonomy deceleration | |

Remarks
When a position of brake pedal is higher than the defined threshold value, this signal is set to "depressed".
When the requested deceleration calculated from a position of brake pedal is higher than the requested deceleration from ADS, this signal is set as "Beyond autonomy deceleration".

3.2.2.21. Intervention of Steering Wheel
This signal shows whether the steering wheel is operated by a driver (intervention).
Values

| Value | Description | Remarks |
|---|---|---|
| 0 | Not turned | |
| 1 | ADS and driver collaboratively work | |
| 2 | Only by human driver | |

Remarks
In "Intervention of steering wheel=1", considering the human driver's intent, EPS system drives the steering with the Human driver collaboratively.
In "intervention of steering wheel=2", considering the human driver's intent, the steering request from ADS is not achieved. (The steering will be driven by human driver.)

3.2.2.22. Intervention of Shift Lever
This signal shows whether the shift lever is controlled by a driver (intervention)
Values

| Value | Description | Remarks |
|---|---|---|
| 0 | OFF | |
| 1 | ON | Controlled (moved to any shift position) |

Remarks
N/A 3.2.2.23. Wheel Speed Pulse (Front Left), Wheel Speed Pulse (Front Right), Wheel Speed Pulse (Rear Left), Wheel Speed Pulse (Rear Right)
Values

| Value | Description | Remarks |
|---|---|---|
| Maximum Value in transmission bits | Invalid value | The sensor is invalid. |
| others | ticks [unit: —] | The number of pulses per one round wheel depends on VP. |

Remarks
A pulse value is integrated at the pulse falling timing.
This wheel speed sensor outputs 96 pulses with a single rotation.

Regardless of invalid/failure of wheel speed sensor, wheel speed pulse will be updated.

When "1" is subtracted from a pulse value which shows "0", the value changes to "0xFF". When "1" is added to a pulse value which shows "0xFF", the value changes to "0".

Until the rotation direction is determined just after ECU is activated, a pulse value will be added as the rotation direction is "Forward".

When detected forward rotation, a pulse value will be added.

When detected reverse rotation, a pulse value will be subtracted.

3.2.2.24. Wheel Rotation Direction (Front Left), Wheel Rotation Direction (Front Right), Wheel Rotation Direction (Rear Left), Wheel Rotation Direction (Rear Right)

Values

| Value | Description | Remarks |
| --- | --- | --- |
| 0 | Forward | |
| 1 | Reverse | |
| 2 | Reserved | |
| 3 | Invalid value | The sensor is invalid. |

Remarks

"Forward" is set until the rotation direction is determined after VP is turned on.

3.2.2.25. Traveling Direction

Moving direction of vehicle

Values

| Value | Description | Remarks |
| --- | --- | --- |
| 0 | Forward | |
| 1 | Reverse | |
| 2 | Standstill | |
| 3 | Undefined | |

Remarks

This signal shows "Standstill" when four wheel speed values are "0" during a constant time.

When shift is changed right after vehicle starts, it is possible to be "Undefined".

3.2.2.26. Vehicle Velocity

Estimated longitudinal velocity of vehicle

Values

| Value | Description | Remarks |
| --- | --- | --- |
| Maximum Value in transmission bits | Invalid value | The sensor is invalid. |
| others | Velocity [unit: m/s] | |

Remarks

The value of this signal is a positive value when both forward direction and reverse direction.

3.2.2.27. Longitudinal Acceleration

Estimated longitudinal acceleration of vehicle

Values

| Value | Description | Remarks |
| --- | --- | --- |
| Minimum Value in transmission bits | Invalid value | The sensor is invalid. |
| others | Acceleration [unit: m/s$^2$] | |

Remarks

Acceleration (+) and deceleration (−) value based on Propulsion Direction Status direction.

3.2.2.28. Lateral Acceleration lateral acceleration of vehicle

Values

| Value | Description | Remarks |
| --- | --- | --- |
| Minimum Value in transmission bits | Invalid value | The sensor is invalid. |
| others | Acceleration [unit: m/s$^2$] | |

Remarks

A positive value shows counterclockwise. A negative value shows clockwise.

3.2.2.29. Yaw Rate

Sensor value of yaw rate

Values

| Value | Description | Remarks |
| --- | --- | --- |
| Minimum Value in transmission bits | Invalid value | The sensor is invalid. |
| others | Yaw rate [unit: deg/s] | |

Remarks

A positive value shows counterclockwise. A negative value shows clockwise.

3.2.2.30. Slipping Detection

Detection of tire glide/spin/skid

| Value | Description | Remarks |
| --- | --- | --- |
| 0 | Not Slipping | |
| 1 | Slipping | |
| 2 | Reserved | |
| 3 | Invalid value | |

Remarks

This signal is determined as "Slipping" when any of the following systems has been activated.

ABS (Anti-lock Braking System)

TRC (TRaction Control)

VSC (Vehicle Stability Control)

VDIM (Vehicle Dynamics Integrated Management)

3.2.2.31. Vehicle Mode State

Autonomous or manual mode

Values

| Value | Description | Remarks |
| --- | --- | --- |
| 0 | Manual Mode | The mode starts from Manual mode. |
| 1 | Autonomous Mode | |

Remarks

The initial state is set to "Manual Mode."

3.2.2.32. Readiness for Autonomization

This signal shows whether a vehicle can change to Autonomous Mode or not

Values

| Value | Description | Remarks |
|---|---|---|
| 0 | Not Ready For Autonomous Mode | |
| 1 | Ready For Autonomous Mode | |
| 3 | Invalid | The status is not determined yet. |

Remarks

N/A

3.2.2.33. Failure Status of VP Functions for Autonomous Mode

This signal is used to show whether VP functions have some failures mode when a vehicle works as Autonomous Mode.

Values

| Value | Description | Remarks |
|---|---|---|
| 0 | No fault | |
| 1 | Fault | |
| 3 | Invalid | The status is not determined yet. |

Remarks

N/A

3.2.2.34. PCS Alert Status

Values

| Value | Description | Remarks |
|---|---|---|
| 0 | Normal | |
| 1 | Alert | Request alert from PCS system |
| 3 | Unavailable | |

Remarks

N/A

3.2.2.35. PCS Preparation Status

Prefill Status as the preparation of PCS Brake

Values

| Value | Description | Remarks |
|---|---|---|
| 0 | Normal | |
| 1 | Active | |
| 3 | Unavailable | |

Remarks

"Active" is a status in which PCS prepares brake actuator to shorten the latency from a deceleration request issued by PCS.

When a value turns to "Active" during Vehicle mode state="Autonomous Mode," "ADS/PCS arbitration status" shows "ADS".

3.2.2.36. PCS Brake/PCS Brake Hold Status

Values

| Value | Description | Remarks |
|---|---|---|
| 0 | Normal | |
| 1 | PCS Brake | |
| 2 | PCS Brake Hold | |
| 7 | Unavailable | |

Remarks

N/A

3.2.2.37. ADS/PCS Arbitration Status

Arbitration status

| Value | Description | Remarks |
|---|---|---|
| 0 | No Request | |
| 1 | ADS | ADS |
| 2 | PCS | PCS Brake or PCS Brake Hold |
| 3 | Invalid value | |

Remarks

When acceleration requested by PCS system in VP is smaller than one requested by ADS, the status is set as "PCS"

When acceleration requested by PCS system in VP is larger than one requested by ADS, the status is set as "ADS"

3.3. APIs for BODY Control
3.3.1. API List for BODY Control
3.3.1.1. Inputs

TABLE 6

Input APIs for BODY Control

| Signal Name | Description | Redundancy |
|---|---|---|
| Turnsignal command | Command to control the turnsignallight mode of the vehicle platform | N/A |
| Headlight command | Command to control the headlight mode of the vehicle platform | N/A |
| Hazardlight command | Command to control the hazardlight mode of the vehicle platform | N/A |
| Horn pattern command | Command to control the pattern of horn ON-time and OFF-time per cycle of the vehicle platform | N/A |
| Horn cycle command | Command to control the number of horn ON/OFF cycles of the vehicle platform | N/A |
| Continuous horn command | Command to control of horn ON of the vehicle platform | N/A |

TABLE 6-continued

Input APIs for BODY Control

| Signal Name | Description | Redundancy |
|---|---|---|
| Front windshield wiper command | Command to control the front windshield wiper of the vehicle platform | N/A |
| Rear windshield wiper command | Command to control the rear windshield wiper mode of the vehicle platform | N/A |
| HVAC (1st row) operation command | Command to start/stop 1st row air conditioning control | N/A |
| HVAC (2nd row) operation command | Command to start/stop 2nd row air conditioning control | N/A |
| Target temperature (1st left) command | Command to set the target temperature around front left area | N/A |
| Target temperature (1st right) command | Command to set the target temperature around front right area | N/A |
| Target temperature (2nd left) command | Command to set the target temperature around rear left area | N/A |
| Target temperature (2nd right) command | Command to set the target temperature around rear right area | N/A |
| HVAC fan (1st row) command | Command to set the fan level on the front AC | N/A |
| HVAC fan (2nd row) command | Command to set the fan level on the rear AC | N/A |
| Air outlet (1st row) command | Command to set the mode of 1st row air outlet | N/A |
| Air outlet (2nd row) command | Command to set the mode of 2nd row air outlet | N/A |
| Air recirculation command | Command to set the air recirculation mode | N/A |
| AC mode command | Command to set the AC mode | N/A |

3.3.1.2. Outputs

TABLE 7

Output APIs for BODY Control

| Signal Name | Description | Redundancy |
|---|---|---|
| Turnsignal status | Status of the current turnsignallight mode of the vehicle platform | N/A |
| Headlight status | Status of the current headlight mode of the vehicle platform | N/A |
| Hazard light status | Status of the current hazardlight mode of the vehicle platform | N/A |
| Horn status | Status of the current horn of the vehicle platform | N/A |
| Front windshield wiper status | Status of the current front windshield wiper mode of the vehicle platform | N/A |
| Rear windshield wiper status | Status of the current rear windshield wiper mode of the vehicle platform | N/A |
| HVAC (1st row) status | Status of activation of the $1^{st}$ row HVAC | N/A |
| HVAC (2nd row) status | Status of activation of the $2^{nd}$ row HVAC | N/A |
| Target temperature (1st left) status | Status of set temperature of $1^{st}$ row left | N/A |
| Target temperature (1st right) status | Status of set temperature of $1^{st}$ row right | N/A |
| Target temperature (2nd left) status | Status of set temperature of $2^{nd}$ row left | N/A |
| Target temperature (2nd right) status | Status of set temperature of $2^{nd}$ row right | N/A |
| HVAC fan (1st row) status | Status of set fan level of $1^{st}$ row | N/A |
| HVAC fan (2nd row) status | Status of set fan level of $2^{nd}$ row | N/A |
| Air outlet (1st row) status | Status of mode of 1st row air outlet | N/A |
| Air outlet (2nd row) status | Status of mode of 2nd row air outlet | N/A |
| Air recirculation status | Status of set air recirculation mode | N/A |
| AC mode status | Status of set AC mode | N/A |
| Seat occupancy (1st right) status | Seat occupancy status in 1st right seat | N/A |
| Seat belt (1st left) status | Status of driver's seat belt buckle switch | N/A |
| Seat belt (1st right) status | Status of passenger's seat belt buckle switch | N/A |
| Seat belt (2nd left) status | Seat belt buckle switch status in 2nd left seat | N/A |
| Seat belt (2nd right) status | Seat belt buckle switch status in 2nd right seat | N/A |
| Seat belt (3rd left) status | Seat belt buckle switch status in 3rd left seat | N/A |
| Seat belt (3rd center) status | Seat belt buckle switch status in 3rd center seat | N/A |
| Seat belt (3rd right) status | Seat belt buckle switch status in 3rd right seat | N/A |

3.3.2. Details of Each API for BODY Control

3.3.2.1. Turnsignal Command
Request to control turn-signal
Values

| Value | Description | Remarks |
|---|---|---|
| 0 | OFF | |
| 1 | Right | Right blinker ON |
| 2 | Left | Left blinker ON |
| 3 | Reserved | |

Remarks
N/A

3.3.2.2. Headlight Command
Request to control headlight
Values

| Value | Description | Remarks |
|---|---|---|
| 0 | No Request | Keep current mode |
| 1 | TAIL mode request | Side lamp mode |
| 2 | HEAD mode request | Lo mode |
| 3 | AUTO mode request | Auto mode |
| 4 | HI mode request | Hi mode |
| 5 | OFF Mode Request | |
| 6-7 | Reserved | |

Remarks
This command is valid when headlight mode on the combination switch="OFF" or "Auto mode=ON."
Driver operation overrides this command.

3.3.2.3. Hazardlight Command
Request to control hazardlight

| Value | Description | Remarks |
|---|---|---|
| 0 | No Request | |
| 1 | ON | |

Remarks
Driver operation overrides this command.
Hazardlight is ON while receiving "ON" command.

3.3.2.4. Horn Pattern Command
Request to choose a pattern of ON-time and OFF-time per cycle
Values

| Value | Description | Remarks |
|---|---|---|
| 0 | No request | |
| 1 | Pattern 1 | ON-time: 250 ms OFF-time: 750 ms |
| 2 | Pattern 2 | ON-time: 500 ms OFF-time: 500 ms |
| 3 | Pattern 3 | Reserved |
| 4 | Pattern 4 | Reserved |
| 5 | Pattern 5 | Reserved |
| 6 | Pattern 6 | Reserved |
| 7 | Pattern 7 | Reserved |

Remarks
N/A

3.3.2.5. Horn Cycle Command
Request to choose the number of ON and OFF cycles
Values
0 to 7 [-]
Remarks
N/A

3.3.2.6. Continuous Horn Command
Request to turn on/off horn
Values

| Value | Description | Remarks |
|---|---|---|
| 0 | No request | |
| 1 | ON | |

Remarks
This command's priority is higher than 3.3.2.4 Horn pattern and 3.3.2.5 Horn cycle command.
Horn is "ON" while receiving "ON" command.

3.3.2.7. Front Windshield Wiper Command
Request to control front windshield wiper
Values

| Value | Description | Remarks |
|---|---|---|
| 0 | OFF mode request | |
| 1 | Lo mode request | |
| 2 | Hi mode request | |
| 3 | Intermittent mode request | |
| 4 | Auto mode request | |
| 5 | Mist mode request | One-time wiping |
| 6, 7 | Reserved | |

Remarks
This command is valid when front windshield wiper mode on a combination switch is "OFF" or "AUTO".
Driver input overrides this command.
Windshieldwiper mode is kept while receiving a command.
Wiping speed of intermittent mode is fixed.

3.3.2.8. Rear Windshield Wiper Command
Request to control rear windshield wiper
Values

| Value | Description | Remarks |
|---|---|---|
| 0 | OFF mode request | |
| 1 | Lo mode request | |
| 2 | Reserved | |
| 3 | Intermittent mode request | |
| 4-7 | Reserved | |

Remarks
Driver input overrides this command
Windshieldwiper mode is kept while receiving a command.
Wiping speed of intermittent mode is fixed.

3.3.2.9. HVAC (1st Row) Operation Command
Request to start/stop 1st row air conditioning control
Values

| Value | Description | Remarks |
|---|---|---|
| 0 | No request | |
| 1 | ON | |
| 2 | OFF | |

Remarks
N/A

3.3.2.10. HVAC (2nd Row) Operation Command
Request to start/stop 2nd row air conditioning control Values

| Value | Description | Remarks |
|---|---|---|
| 0 | No request | |
| 1 | ON | |
| 2 | OFF | |

Remarks
  N/A

3.3.2.11. Target Temperature (1st Left) Command
Request to set target temperature in front left area
Values

| Value | Description | Remarks |
|---|---|---|
| 0 | No request | |
| 60 to 85 [unit: ° F.] (by 1.0° F.) | Target temperature | |

Remarks
  In case ° C. is used in VP, value should be set as ° C.

3.3.2.12. Target Temperature (1st Right) Command
Request to set target temperature in front right area
Values

| Value | Description | Remarks |
|---|---|---|
| 0 | No request | |
| 60 to 85 [unit: ° F.] (by 1.0° F.) | Target temperature | |

Remarks
  In case ° C. is used in VP, value should be set as ° C.

3.3.2.13. Target Temperature (2nd Left) Command
Request to set target temperature in rear left area
Values

| Value | Description | Remarks |
|---|---|---|
| 0 | No request | |
| 60 to 85 [unit: ° F.] (by 1.0° F.) | Target temperature | |

Remarks
  In case ° C. is used in VP, value should be set as ° C.

3.3.2.14. Target Temperature (2nd Right) Command
Request to set target temperature in rear right area
Values

| Value | Description | Remarks |
|---|---|---|
| 0 | No request | |
| 60 to 85 [unit: ° F.] (by 1.0° F.) | Target temperature | |

Remarks
  In case ° C. is used in VP, value should be set as ° C.

3.3.2.15. HVAC Fan (1st Row) Command
Request to set fan level of front AC
Values

| Value | Description | Remarks |
|---|---|---|
| 0 | No request | |
| 1 to 7 (Maximum) | Fan level | |

Remarks
  If you would like to turn the fan level to 0 (OFF), you should transmit "HVAC (1st row) operation command=OFF."
  If you would like to turn the fan level to AUTO, you should transmit "HVAC (1st row) operation command=ON."

3.3.2.16. HVAC Fan (2nd Row) Command
Request to set fan level of rear AC
Values

| Value | Description | Remarks |
|---|---|---|
| 0 | No request | |
| 1 to 7 (Maximum) | Fan level | |

Remarks
  If you would like to turn the fan level to 0 (OFF), you should transmit "HVAC (2nd row) operation command=OFF."
  If you would like to turn the fan level to AUTO, you should transmit "HVAC (2nd row) operation command=ON."

3.3.2.17. Air Outlet (1st Row) Command
Request to set 1st row air outlet mode
Values

| Value | Description | Remarks |
|---|---|---|
| 0 | No Operation | |
| 1 | UPPER | Air flows to upper body |
| 2 | U/F | Air flows to upper body and feet |
| 3 | FEET | Air flows to feet |
| 4 | F/D | Air flows to feet and windshield defogger |

Remarks

3.3.2.18. Air Outlet (2nd Row) Command
Request to set 2nd row air outlet mode
Values

| Value | Description | Remarks |
|---|---|---|
| 0 | No Operation | |
| 1 | UPPER | Air flows to upper body |
| 2 | U/F | Air flows to the upper body and feet |
| 3 | FEET | Air flows to feet. |

Remarks
  N/A

3.3.2.19. Air Recirculation Command
Request to set air recirculation mode
Values

| Value | Description | Remarks |
|---|---|---|
| 0 | No request | |
| 1 | ON | |
| 2 | OFF | |

Remarks
  N/A 3.3.2.20. AC Mode Command
  Request to set AC mode
Values

| Value | Description | Remarks |
|---|---|---|
| 0 | No request | |
| 1 | ON | |
| 2 | OFF | |

Remarks
  N/A 3.3.2.21. Turnsignal Status
Values

| Value | Description | Remarks |
|---|---|---|
| 0 | OFF | |
| 1 | Left | |
| 2 | Right | |
| 3 | Invalid | |

Remarks
  N/A 3.3.2.22. Headlight Status
Values

| Value | Description | Remarks |
|---|---|---|
| 0 | OFF | |
| 1 | TAIL | |
| 2 | Lo | |
| 3 | Reserved | |
| 4 | Hi | |
| 5-6 | Reserved | |
| 7 | Invalid | |

Remarks
  N/A 3.3.2.23. Hazardlight Status
Values

| Value | Description | Remarks |
|---|---|---|
| 0 | OFF | |
| 1 | Hazard | |
| 2 | Reserved | |
| 3 | Invalid | |

Remarks
  N/A 3.3.2.24. Horn Status
Values

| Value | Description | Remarks |
|---|---|---|
| 0 | OFF | |
| 1 | ON | |
| 2 | Reserved | |
| 3 | Invalid | |

Remarks
  In the case that 3.3.2.4 the Horn Pattern Command is active, the Horn status is "1" even if there are OFF periods in some patterns.

3.3.2.25. Front Windshield Wiper Status
Values

| Value | Description | Remarks |
|---|---|---|
| 0 | OFF | |
| 1 | Lo | |
| 2 | Hi | |
| 3 | INT | |
| 4-5 | Reserved | |
| 6 | Fail | |
| 7 | Invalid | |

Remarks
  N/A 3.3.2.26. Rear Windshield Wiper Status
Values

| Value | Description | Remarks |
|---|---|---|
| 0 | OFF | |
| 1 | Lo | |
| 2 | Reserved | |
| 3 | INT | |
| 4-5 | Reserved | |
| 6 | Fail | |
| 7 | Invalid | |

Remarks
  N/A 3.3.2.27. HVAC (1st Row) Status
Values

| Value | Description | Remarks |
|---|---|---|
| 0 | OFF | |
| 1 | ON | |

Remarks
  N/A 3.3.2.28. HVAC (2nd Row) Status
Values

| Value | Description | Remarks |
|---|---|---|
| 0 | OFF | |
| 1 | ON | |

Remarks
  N/A 3.3.2.29. Target Temperature (1st Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
  In case ° C. is used in VP, value should be set as ° C.

3.3.2.30. Target Temperature (1st Right) Status

Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
In case ° C. is used in VP, value should be set as ° C.
3.3.2.31. Target Temperature (2nd Left) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
In case ° C. is used in VP, value should be set as ° C.
3.3.2.32. Target Temperature (2nd Right) Status
Values

| Value | Description | Remarks |
|---|---|---|
| 0 | Lo | Max cold |
| 60 to 85 [unit: ° F.] | Target temperature | |
| 100 | Hi | Max hot |
| FFh | Unknown | |

Remarks
In case ° C. is used in VP, value should be set as ° C.
3.3.2.33. HVAC Fan (1st Row) Status
Values

| Value | Description | Remarks |
|---|---|---|
| 0 | OFF | |
| 1 to 7 | Fan Level | |
| 8 | Undefined | |

Remarks
N/A
3.3.2.34. HVAC Fan (2nd Row) Status
Values

| Value | Description | Remarks |
|---|---|---|
| 0 | OFF | |
| 1 to 7 | Fan Level | |
| 8 | Undefined | |

Remarks
N/A
3.3.2.35. Air Outlet (1st Row) Status
Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 4 | F/D | Air flows to feet and windshield defogger operates |
| 5 | DEF | Windshield defogger |
| 7 | Undefined | |

Remarks
N/A
3.3.2.36. Air Outlet (2nd Row) Status
Values

| Value | Description | Remarks |
|---|---|---|
| 0 | ALL OFF | |
| 1 | UPPER | Air flows to upper body |
| 2 | U/F | Air flows to upper body and feet |
| 3 | FEET | Air flows to feet. |
| 7 | Undefined | |

Remarks
N/A
3.3.2.37. Air Recirculation Status
Values

| Value | Description | Remarks |
|---|---|---|
| 0 | OFF | |
| 1 | ON | |

Remarks
N/A
3.3.2.38. AC Mode Status
Values

| Value | Description | Remarks |
|---|---|---|
| 0 | OFF | |
| 1 | ON | |

Remarks
N/A
3.3.2.39. Seat Occupancy (1st Right) Status
Values

| Value | Description | Remarks |
|---|---|---|
| 0 | Not occupied | |
| 1 | Occupied | |
| 2 | Undecided | In case of IG OFF or communication disruption to seat sensor |
| 3 | Failed | |

Remarks
When there is luggage on the seat, this signal may be set as "Occupied".
3.3.2.40. Seat Belt (1st Left) Status
Values

| Value | Description | Remarks |
|---|---|---|
| 0 | Buckled | |
| 1 | Unbuckled | |

-continued

| Value | Description | Remarks |
|---|---|---|
| 2 | Undetermined | In case where sensor does not work just after IG-ON |
| 3 | Fault of a switch | |

Remarks
  N/A

3.3.2.41. Seat Belt (1st Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Fault of a switch | |

Remarks
  N/A

3.3.2.42. Seat Belt (2nd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure

3.3.2.43. Seat Belt (2nd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure

3.3.2.44. Seat Belt (3rd Left) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure

3.3.2.45. Seat Belt (3rd Center) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure

3.3.2.46. Seat Belt (3rd Right) Status
Values

| Value | Description | Remarks |
|---|---|---|
| 0 | Buckled | |
| 1 | Unbuckled | |
| 2 | Undetermined | In case where sensor does not work just after IG-ON |
| 3 | Reserved | |

Remarks
  cannot detect sensor failure

3.4. APIs for Power Control

3.4.1. API List for Power Control
3.4.1.1. Inputs

TABLE 8

Input APIs for Power control

| Signal Name | Description | Redundancy |
|---|---|---|
| Power mode command | Command to control the power mode of VP | N/A |

3.4.1.2. Outputs

TABLE 9

Output APIs for Power control

| Signal Name | Description | Redundancy |
|---|---|---|
| Power mode status | Status of the current power mode of VP | N/A |

3.4.2. Details of Each API for Power Control
3.4.2.1. Power Mode Command
  Request to control power mode
Values

| Value | Description | Remarks |
|---|---|---|
| 0 | No request | |
| 1 | Sleep | Turns OFF the vehicle |
| 2 | Wake | Turns ON VCIB |
| 3 | Reserved | Reserved for data expansion |
| 4 | Reserved | Reserved for data expansion |
| 5 | Reserved | Reserved for data expansion |
| 6 | Drive | Turns ON the vehicle |

Remarks

Figure 12:
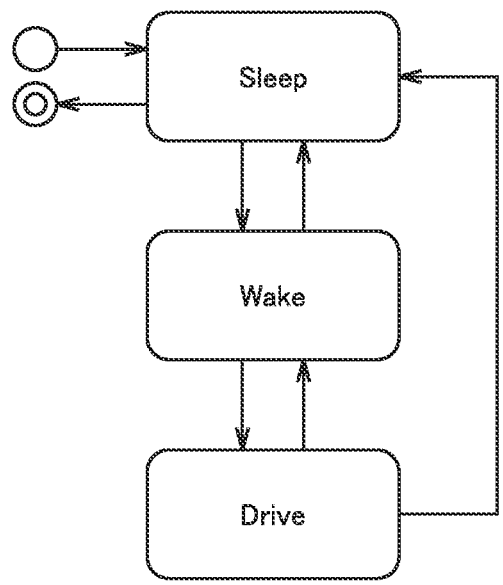
FIG. 12 is a state machine diagram of the power mode.

The state machine diagram of the power modes is shown in FIG. 12.

[Sleep]

Vehicle power off condition. In this mode, the main battery does not supply power to each system, and neither VCIB nor other VP ECUs are activated.

[Wake]

VCIB is awake by the auxiliary battery. In this mode, ECUs other than VCIB are not awake except for some of the body electrical ECUs.

[Driving Mode]

Vehicle power on condition. In this mode, the main battery supplies power to the whole VP and all the VP ECUs including VCIB are awake.

3.4.2.2. Power Mode Status

Values

| Value | Description | Remarks |
| --- | --- | --- |
| 0 | Reserved | |
| 1 | Sleep | |
| 2 | Wake | |
| 3 | Reserved | |
| 4 | Reserved | |
| 5 | Reserved | |
| 6 | Drive | |
| 7 | Unknown | means unhealthy situation would occur |

Remarks

VCIB will transmit [Sleep] as Power Mode Status continuously for 3000 [ms] after executing the sleep sequence. And then, VCIB will shut down.

ADS should stop transmitting signals to VCIB while VCIB is transmitting [Sleep].

3.5. APIs for Failure Notification 3.5.1. API List for Failure Notification 3.5.1.1. Inputs

TABLE 10

| Input APIs for Failure Notification | | |
| --- | --- | --- |
| Signal Name | Description | Redundancy |
| N/A | N/A | N/A |

3.5.1.2. Outputs

TABLE 11

| Output APIs for Failure Notification | | |
| --- | --- | --- |
| Signal Name | Description | Redundancy |
| Request for ADS operation | | Applied |
| Impact detection signal | | N/A |
| Performance deterioration of brake system | | Applied |
| Performance deterioration of propulsion system | | N/A |
| Performance deterioration of shift control system | | N/A |
| Performance deterioration of immobilization system | | Applied |
| Performance deterioration of steering system | | Applied |
| Performance deterioration of power supply system | | Applied |

TABLE 11-continued

| Output APIs for Failure Notification | | |
| --- | --- | --- |
| Signal Name | Description | Redundancy |
| Performance deterioration of communication system | | Applied |

3.5.2. Details of Each API for Failure Notification 3.5.2.1. Request for ADS Operation Values

| Value | Description | Remarks |
| --- | --- | --- |
| 0 | No request | |
| 1 | Need maintenance | |
| 2 | Need to be back to garage | |
| 3 | Need to stop immediately | |
| Others | Reserved | |

Remarks

This signal shows a behavior which the ADS is expected to do according to a failure which happened in the VP.

3.5.2.2. Impact Detection Signal

Values

| Value | Description | Remarks |
| --- | --- | --- |
| 0 | Normal | |
| 5 | Crash detection with activated airbag | |
| 6 | Crash detection with shut off high voltage circuit | |
| 7 | Invalid value | |
| Others | Reserved | |

Remarks

When the event of crash detection is generated, the signal is transmitted 50 consecutive times every 100 [ms]. If the crash detection state changes before the signal transmission is completed, the high signal of priority is transmitted.

Priority: crash detection>normal

Transmits for 5 s regardless of ordinary response at crash, because the vehicle breakdown judgment system shall be sent a voltage OFF request for 5 s or less after crash in HV vehicle.

Transmission interval is 100 ms within fuel cutoff motion delay allowance time (1 s) so that data can be transmitted more than 5 times.

In this case, an instantaneous power interruption is taken into account.

3.5.2.3. Performance Deterioration of Brake System

Values

| Value | Description | Remarks |
| --- | --- | --- |
| 0 | Normal | — |
| 1 | Deterioration detected | — |

Remarks
  N/A

3.5.2.4. Performance Deterioration of Propulsion System

Values

| Value | Description | Remarks |
|---|---|---|
| 0 | Normal | — |
| 1 | Deterioration detected | — |

Remarks
  N/A

3.5.2.5. Performance Deterioration of Shift Control System

Values

| Value | Description | Remarks |
|---|---|---|
| 0 | Normal | — |
| 1 | Deterioration detected | — |

Remarks
  N/A

3.5.2.6. Performance Deterioration of Immobilization System

Values

| Value | Description | Remarks |
|---|---|---|
| 0 | Normal | — |
| 1 | Deterioration detected | — |

Remarks
  N/A

3.5.2.7. Performance Deterioration of Steering System

Values

| Value | Description | Remarks |
|---|---|---|
| 0 | Normal | — |
| 1 | Deterioration detected | — |

Remarks
  N/A

3.5.2.8. Performance Deterioration of Power Supply System

Values

| Value | Description | Remarks |
|---|---|---|
| 0 | Normal | — |
| 1 | Deterioration detected | — |

Remarks
  N/A

3.5.2.9. Performance Deterioration of Communication System

Values

| Value | Description | Remarks |
|---|---|---|
| 0 | Normal | — |
| 1 | Deterioration detected | — |

Remarks
  N/A

3.6. APIs for Security

3.6.1. API List for Security

3.6.1.1. Inputs

TABLE 12

| Input APIs for Security | | |
|---|---|---|
| Signal Name | Description | Redundancy |
| Door Lock (front) command | Command to control both 1st doors lock | N/A |
| Door Lock (rear) command | Command to control both 2nd doors and trunk lock | N/A |
| Central door lock command | Command to control the all door lock | N/A |
| Device Authentication Signature the 1st word | This is the 8th byte from the 1st byte of the Signature value. | N/A |
| Device Authentication Signature the 2nd word | This is the 16th byte from the 9th byte of the Signature value. | N/A |
| Device Authentication Signature the 3rd word | This is the 24th byte from the 17th byte of the Signature value. | N/A |
| Device Authentication Signature the 4th word | This is the 32th byte from the 25th byte of the Signature value. | N/A |

3.6.1.2. Outputs

TABLE 13

| Output APIs for Security | | |
|---|---|---|
| Signal Name | Description | Redundancy |
| Door lock (1st left) status | Status of the current 1st-left door lock | N/A |
| Door lock (1st right) status | Status of the current 1st-right door lock | N/A |
| Door lock (2nd left) status | Status of the current 2nd-left door lock | N/A |
| Door lock (2nd right) status | Status of the current 2nd-right door lock | N/A |
| Trunk Lock status | Status of the current trunk (back door) lock | N/A |
| Central door lock status | Status of the current all door lock | N/A |
| Alarm system status | Status of the current vehicle alarm | N/A |
| Device Authentication Seed the 1st word | This is the 8th byte from the 1st byte of the Seed value. | N/A |
| Device Authentication Seed the 2nd word | This is the 16th byte from the 9th byte of the Seed value. | N/A |
| Trip Counter | This counter is incremented in units of trips by the Freshness Value management master ECU. | N/A |
| Reset Counter | This counter is incremented periodically by the Freshness Value management master ECU. | N/A |
| 1st Left Door Open Status | Status of the current 1st-left door open/close of the vehicle platform | N/A |
| 1st Right Door Open Status | Status of the current 1st-right door open/close of the vehicle platform | N/A |
| 2nd Left Door Open Status | Status of the current 2nd-left door open/close of the vehicle platform | N/A |
| 2nd Right Door Open Status | Status of the current 2nd-right door open/close of the vehicle platform | N/A |
| Trunk Status | Status of the current trunk door open of the vehicle platform | N/A |
| Hood Open Status | Status of the current hood open/close of the vehicle platform | N/A |

3.6.2. Details of Each API for Security
3.6.2.1. Door Lock (Front) Command, Door Lock (Rear) Command
Values

| Value | Description | Remarks |
|---|---|---|
| 0 | No Request | |
| 1 | Lock | Not supported in Toyota VP |
| 2 | Unlock | |
| 3 | Reserved | |

Remarks

If ADK requests for unlocking front side, both front doors are unlocked.

If ADK requests for unlocking rear side, both 2nd row and trunk doors are unlocked.

If ADK requests for locking any door, it should use "Central door lock command."

(The functionality for individual locking is not supported in Toyota VP.)

3.6.2.2. Central Door Lock Command
Request to control all doors' lock
Values

| Value | Description | Remarks |
|---|---|---|
| 0 | No Request | |
| 1 | Lock (all) | |
| 2 | Unlock (all) | |
| 3 | Reserved | |

Remarks
N/A 3.6.2.3. Device Authentication Signature the 1st word, Device Authentication Signature the 2nd word, Device Authentication Signature the 3rd word, Device Authentication Signature the 4th word, Device Authentication Seed the 1st word, Device Authentication Seed the 2nd word Device Authentication Signature the 1st word is presented in from 1st to 8th bytes of the signature.

Device Authentication Signature the 2nd word is presented in from 9th to 16th bytes of the signature.

Device Authentication Signature the 3rd word is presented in from 17th to 24th bytes of the signature.

Device Authentication Signature the 4th word is presented in from 25th to 32nd bytes of the signature.

Device Authentication Seed the 1st word is presented in from 1st to 8th bytes of the seed.

Device Authentication Seed the 2nd word is presented in from 9th to 16th bytes of the seed.

3.6.2.4. Door Lock (1st Left) Status
Values

| Value | Description | Remarks |
|---|---|---|
| 0 | Reserved | |
| 1 | Locked | |
| 2 | Unlocked | |
| 3 | Invalid | |

Remarks
N/A 3.6.2.5. Door Lock (1st Right) Status
Values

| Value | Description | Remarks |
|---|---|---|
| 0 | Reserved | |
| 1 | Locked | |
| 2 | Unlocked | |
| 3 | Invalid | |

Remarks
N/A 3.6.2.6. Door Lock (2nd Left) Status
Values

| Value | Description | Remarks |
|---|---|---|
| 0 | Reserved | |
| 1 | Locked | |
| 2 | Unlocked | |
| 3 | Invalid | |

Remarks
N/A 3.6.2.7. Door Lock (2nd Right) Status
Values

| Value | Description | Remarks |
|---|---|---|
| 0 | Reserved | |
| 1 | Locked | |
| 2 | Unlocked | |
| 3 | Invalid | |

Remarks
N/A 3.6.2.8. Door Lock Status of all Doors
Values

| Value | Description | Remarks |
|---|---|---|
| 0 | Reserved | |
| 1 | All Locked | |
| 2 | Anything Unlocked | |
| 3 | Invalid | |

Remarks
In case any doors are unlocked, "Anything Unlocked."
In case all doors are locked, "All Locked."

3.6.2.9. Alarm System Status
Values

| Value | Description | Remarks |
|---|---|---|
| 0 | Disarmed | Alarm System is not activated. |
| 1 | Armed | Alarm System is activated without alarming. |
| 2 | Active | Alarm System is activated, and the alarm is beeping. |
| 3 | Invalid | |

Remarks
N/A 3.6.2.9.1. Trip Counter
This counter is incremented in a unit of trips by the Freshness Value management master ECU.

Values
  0-FFFFh
Remarks
  This value is used to create a Freshness value.
  For details, please refer to the other material [the specification of Toyota's MAC module].
3.6.2.9.2. Reset Counter
  This counter is incremented periodically by the Freshness Value management master ECU.
Values
  0-FFFFFh
Remarks
  This value is used to create a Freshness value.
  For details, please refer to the other material [the specification of Toyota's MAC module].
3.6.2.10. 1st Left Door Open Status
  Status of the current 1st-left door open/close of the vehicle platform
Values

| Value | Description | Remarks |
|---|---|---|
| 0 | Reserved | |
| 1 | Open | |
| 2 | Closes | |
| 3 | Invalid | |

Remarks
  N/A
3.6.2.11. 1st Right Door Open Status
  Status of the current 1st-right door open/close
Values

| Value | Description | Remarks |
|---|---|---|
| 0 | Reserved | |
| 1 | Open | |
| 2 | Close | |
| 3 | Invalid | |

Remarks
  N/A
3.6.2.12. 2nd Left Door Open Status
  Status of the current 2nd-left door open/close
Values

| Value | Description | Remarks |
|---|---|---|
| 0 | Reserved | |
| 1 | Open | |
| 2 | Close | |
| 3 | Invalid | |

Remarks
  N/A
3.6.2.13. 2nd Right Door Open Status
  Status of the current 2nd-right door open/close
Values

| Value | Description | Remarks |
|---|---|---|
| 0 | Reserved | |
| 1 | Open | |
| 2 | Close | |
| 3 | Invalid | |

Remarks
  N/A
3.6.2.14. Trunk Status
  Status of the current trunk door open/close
Values

| Value | Description | Remarks |
|---|---|---|
| 0 | Reserved | |
| 1 | Open | |
| 2 | Close | |
| 3 | Invalid | |

Remarks
  N/A
3.6.2.15. Hood Open Status
  Status of the current hood open/close
Values

| Value | Description | Remarks |
|---|---|---|
| 0 | Reserved | |
| 1 | Open | |
| 2 | Close | |
| 3 | Invalid | |

Remarks
  N/A

4. API GUIDES TO CONTROL TOYOTA VEHICLES

This section shows in detail the way of using APIs for Toyota vehicles.

4.1. APIs for Vehicle Motion Control 4.1.1. API List for Vehicle Motion Control
  Input and output APIs for vehicle motion control are shown in Table 14 and Table 15, respectively. Usage guides of some APIs are presented in the following sections as indicated in each table.
4.1.1.1. Inputs

TABLE 14

Input APIs for Vehicle Motion Control

| Signal Name | Description | Redundancy | Usage Guide |
|---|---|---|---|
| Propulsion Direction Command | Request for shift change from/to forward (D range) to/from back (R range) | N/A | 4.1.2.1 |
| Immobilization Command | Request for turning on/off WheelLock | Applied | 4.1.2.2 |
| Standstill Command | Request for keeping on/off stationary | Applied | 4.1.2.3 |
| Acceleration Command | Request for acceleration/deceleration | Applied | 4.1.2.1 4.1.2.2 4.1.2.3 4.1.2.4 |
| Front Wheel Steer Angle Command | Request for front wheel steer angle | Applied | 4.1.2.5 |

TABLE 14-continued

Input APIs for Vehicle Motion Control

| Signal Name | Description | Redundancy | Usage Guide |
|---|---|---|---|
| Vehicle Mode Command | Request for changing from/to manual mode to/from Autonomous Mode | Applied | 4.1.2.6 |
| High Dynamics Command | Request for increasing braking response performance* | Applied | — |

*Reaction time in VP upon a request from ADK

4.1.1.2. Outputs

TABLE 15

Output APIs for Vehicle Motion Control

| Signal Name | Description | Redundancy | Usage Guide |
|---|---|---|---|
| Propulsion Direction Status | Current shift status | N/A | — |
| Immobilization Status | Status of immobilization (e g. EPB and Shift P) | Applied | 4.1.2.2 4.1.2.3 |
| Standstill Status | Standstill status | N/A | 4.1.2.3 |
| Estimated Gliding Acceleration | Estimated vehicle acceleration/deceleration when throttle is fully closed | N/A | — |
| Estimated maximum acceleration | Estimated maximum acceleration | Applied | — |
| Estimated maximum deceleration | Estimated maximum deceleration | Applied | — |
| Front wheel steer angle | Front wheel steer angle | Applied | 4.1.2.5 |
| Front wheel steer angle rate | Front wheel steer angle rate | Applied | — |
| Front wheel steer angle rate limitation | Road wheel angle rate limit | Applied | — |
| Estimated maximum lateral acceleration | Estimated max lateral acceleration | Applied | — |
| Estimated maximum lateral acceleration rate | Estimated max lateral acceleration rate | Applied | — |
| Intervention of accelerator pedal | This signal shows whether the accelerator pedal is depressed by a driver (intervention) | N/A | 4.1.2.4 |
| Intervention of brake pedal | This signal shows whether the brake pedal is depressed by a driver (intervention) | N/A | — |
| Intervention of steering wheel | This signal shows whether the steering wheel is turned by a driver (intervention) | N/A | 4.1.2.5 |
| Intervention of shift lever | This signal shows whether the shift lever is controlled by a driver (intervention) | N/A | — |
| Wheel speed pulse (front left) | Pulse from wheel speed sensor (Front Left Wheel) | N/A | — |
| Wheel rotation direction (front left) | Rotation direction of wheel (Front Left) | N/A | — |
| Wheel speed pulse (front right) | Pulse from wheel speed sensor (Front Right Wheel) | N/A | — |
| Wheel rotation direction (front right) | Rotation direction of wheel (Front Right) | N/A | — |
| Wheel speed pulse (rear left) | Pulse from wheel speed sensor (Rear Left Wheel) | Applied | — |
| Wheel rotation direction (Rear left) | Rotation direction of wheel (Rear Left) | Applied | — |
| Wheel speed pulse (rear right) | Pulse from wheel speed sensor (Rear Right Wheel) | Applied | — |
| Wheel rotation direction (Rear right) | Rotation direction of wheel (Rear Right) | Applied | — |
| Traveling direction | Moving direction of vehicle | Applied | 4.1.2.1 4.1.2.3 |
| Vehicle velocity | Estimated longitudinal velocity of vehicle | Applied | 4.1.2.2 |
| Longitudinal acceleration | Estimated longitudinal acceleration of vehicle | Applied | — |
| Lateral acceleration | Sensor value of lateral acceleration of vehicle | Applied | — |
| Yawrate | Sensor value of Yaw rate | Applied | — |
| Slipping Detection | Detection of tire glide/spin/skid | Applied | — |
| Vehicle mode state | State of whether Autonomous Mode, manual mode or others | Applied | 4.1.2.6 |
| Readiness for autonomization | Situation of whether the vehicle can transition to Autonomous Mode or not | Applied | 4.1.2.6 |
| Failure status of VP functions for Autonomous Mode | This signal is used to show whether VP functions have some failures mode when a vehicle works as Autonomous Mode. | Applied | — |
| PCS Alert Status | Status of PCS (Alert) | N/A | — |
| PCS Preparation Status | Status of PCS (Prefill) | N/A | — |
| PCS Brake/PCS Brake Hold Status | Status of PCS (PB/PBH) | N/A | — |
| ADS/PCS arbitration status | ADS/PCS arbitration status | N/A | — |

4.1.2. API guides in Details for Vehicle Motion Control 4.1.2.1. Propulsion Direction Command Please refer to 3.2.2.1 for value and remarks in detail.

Figure 13:
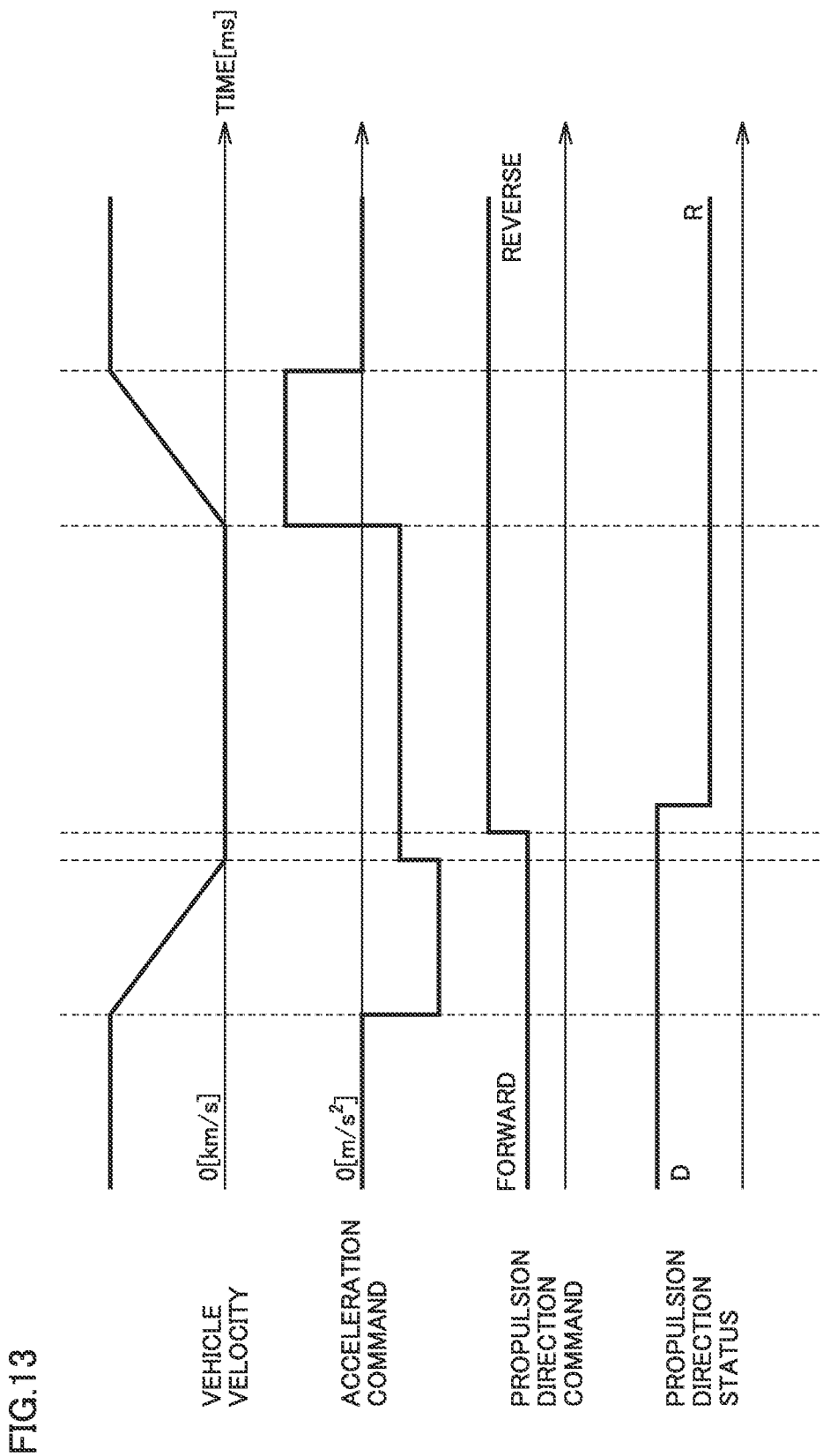
FIG. 13 is a diagram showing details of shift change sequences.

FIG. 13 shows shift change sequences in detail.

First deceleration is requested by Acceleration Command and the vehicle is stopped. When Traveling direction is set to "standstill", any shift position can be requested by Propulsion Direction Command. (In FIG. 13, "D" "R").

Deceleration has to be requested by Acceleration Command until completing shift change.

After shift position is changed, acceleration/deceleration can be chosen based on Acceleration Command.

While Vehicle mode state=Autonomous Mode, driver's shift lever operation is not accepted.

4.1.2.2. Immobilization Command

Please refer to 3.2.2.2 for value and remarks in detail.

Figure 14:
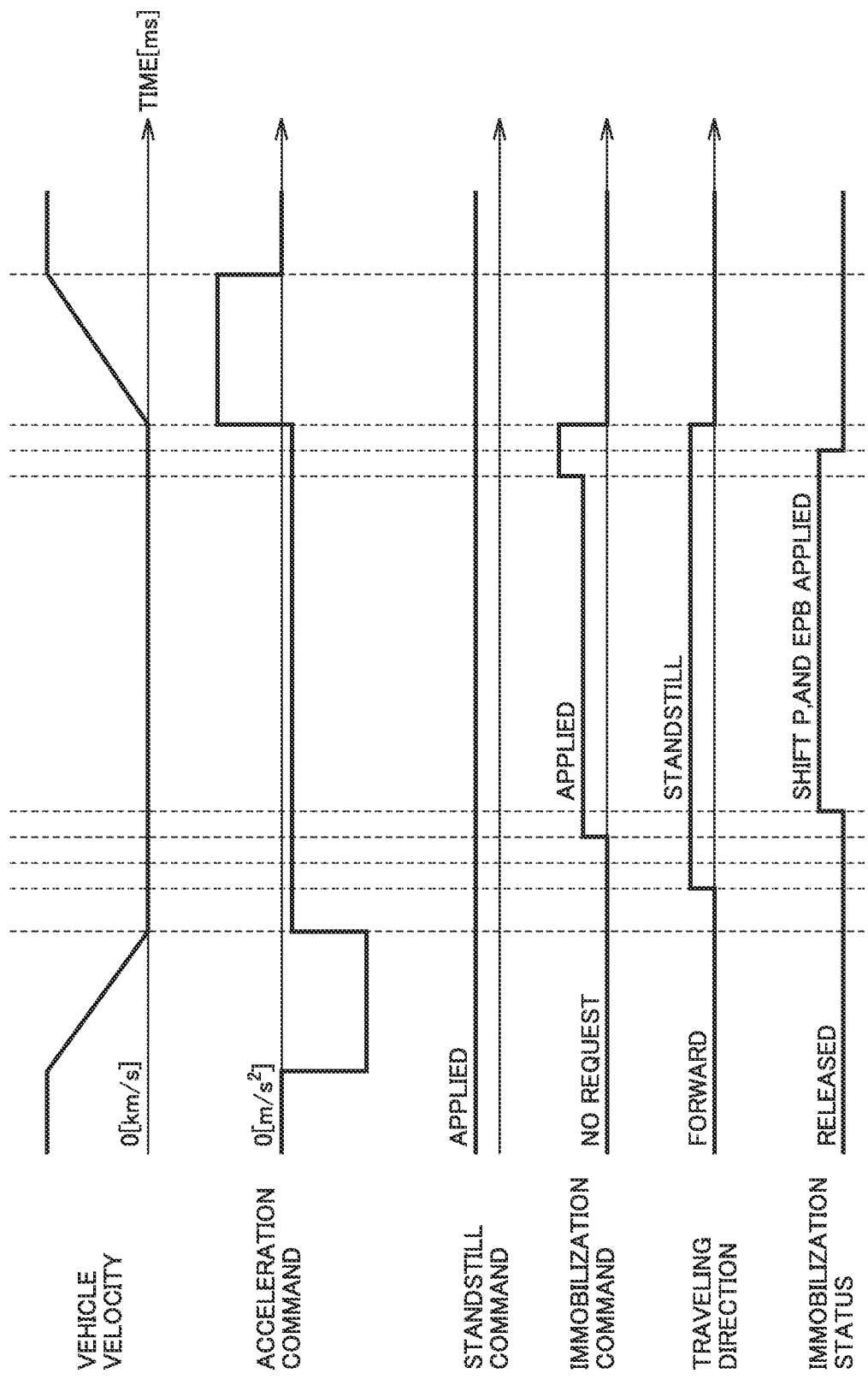
FIG. 14 is a diagram showing immobilization sequences.

FIG. 14 shows how to activate/deactivate immobilization function.

Deceleration is requested with Acceleration Command to make a vehicle stop. When Vehicle velocity goes to zero, Immobilization function is activated by Immobilization Command="Applied". Acceleration Command is set to Deceleration until Immobilization Status is set to "Applied".

When deactivating Immobilization function, Immobilization Command="Released" has to be requested and simultaneously Acceleration Command has to be set as deceleration until confirming Immobilization Status="Released".

After Immobilization function is deactivated, the vehicle can be accelerated/decelerated based on Acceleration Command.

4.1.2.3. Standstill Command

Please refer to 3.2.2.3 for value and remarks in detail.

In case where Standstill Command is set as "Applied", brakehold function can be ready to be used and brakehold function is activated in a condition where a vehicle stops and Acceleration Command is set as Deceleration (<0). And then Standstill Status is changed to "Applied" On the other hand, in case where Standstill Command is set as "Released", brakehold function is deactivated.

Figure 15:
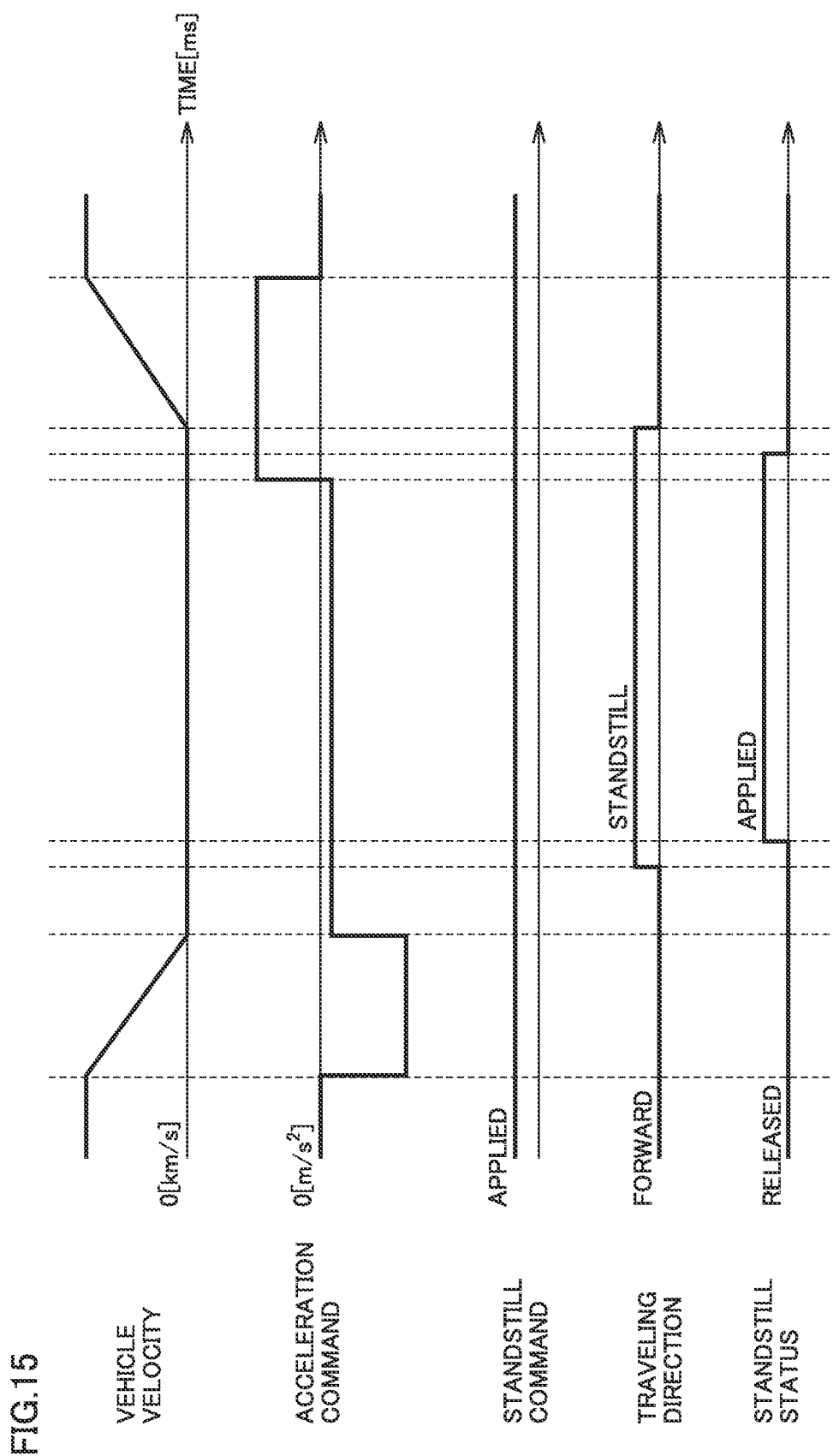
FIG. 15 is a diagram showing standstill sequences.

FIG. 15 shows standstill sequences.

To make a vehicle stop, deceleration is requested with Acceleration Command.

When the vehicle stops for a while, Traveling direction is changed to "standstill". Even during Standstill status="Applied", deceleration shall be requested with Acceleration Command.

If you want the vehicle to move forward, Acceleration Command is set as Acceleration (>0). Then brake hold function is released and the vehicle is accelerated.

4.1.2.4. Acceleration Command

Please refer to 3.2.2.4 for value and remarks in detail.

The below shows how a vehicle behaves when an acceleration pedal is operated.

In case where the accelerator pedal is operated, a maximum acceleration value of either 1) one calculated from accelerator pedal stroke or 2) Acceleration Command input from ADK is chosen. ADK can see which value is selected by checking Intervention of accelerator pedal.

The below shows how a vehicle behaves when a brake pedal is operated.

Deceleration value in the vehicle is the sum of 1) one calculated from the brake pedal stroke and 2) one requested from ADK.

4.1.2.5. Front Wheel Steer Angle Command

Please refer to 3.2.2.5 for value and remarks in detail.

The below shows the way of using Front Wheel Steer Angle Command.

Front Wheel Steer Angle Command is set as a relative value from Front wheel steer angle.

For example, in case where Front wheel steer angle=0.1 [rad] and a vehicle goes straight;

If ADK would like to go straight, Front Wheel Steer Angle Command should be set to 0+0.1=0.1[rad].

If ADK requests to steer by −0.3 [rad], Front Wheel Steer Angle Command should be set to −0.3+0.1=−0.2 [rad].

The below shows how a vehicle behaves when a driver operates the steering.

A maximum value is selected either from 1) one calculated from steering wheel operation by the driver or 2) one requested by ADK.

Note that Front Wheel Steer Angle Command is not accepted if the driver strongly operates the steering wheel. This situation can be found by Intervention of steering wheel flag.

4.1.2.6. Vehicle Mode Command

Figure 16:
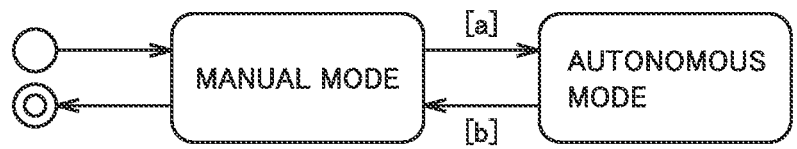
FIG. 16 is a state machine diagram of an autonomy state.

The state machine of mode transition for Autono-MaaS vehicle is shown in FIG. 16.

The explanation of each state is shown as follows.

| State | Description |
| --- | --- |
| Manual | A vehicle begins with this state and is under a control of a human driver. |
| | ADK cannot give any controls (except some commands) to VP. |
| | Power mode status and Vehicle mode state are in the followings: |
| | Power mode status = Wake or Drive |
| | Vehicle mode state = Manual Mode |
| Autonomy | ADK can communicate to VP after authentication is successful. |
| | VP is under the control of the ADK as a result of being issued "Request for Autonomy." |
| | Power mode status and Vehicle mode state are in the followings: |
| | Power mode status - Drive |
| | Vehicle mode state = Autonomous Mode |

The explanation of each transition is shown as follows.

| Transition | Conditions |
| --- | --- |
| a | When the following conditions are established, the mode will be transitioned from Manual to Autonomy: |
| | The ADK is authenticated, |
| | Power mode status = Drive, |
| | Readiness for autonomization = Ready For Autonomy |
| | Vehicle Mode Command = Request For Autonomy. |
| b | When the following conditions are established, the mode will be transitioned from Autonomy to Manual: |
| | Vehicle Mode Command = Deactivation Request. |

4.2. APIs for BODY Control

4.2.1. API List for BODY Control
4.2.1.1. Inputs

TABLE 16

Input APIs for BODY Control

| Signal Name | Description | Redundancy | Usage Guide |
|---|---|---|---|
| Turnsignal command | Command to control the turnsignallight mode of the vehicle platform | N/A | — |
| Headlight command | Command to control the headlight mode of the vehicle platform | N/A | — |
| Hazardlight command | Command to control the hazardlight mode of the vehicle platform | N/A | — |
| Horn pattern command | Command to control the pattern of horn ON-time and OFF-time per cycle of the vehicle platform | N/A | — |
| Horn cycle command | Command to control the number of horn ON/OFF cycles of the vehicle platform | N/A | — |
| Continuous horn command | Command to control of horn ON of the vehicle platform | N/A | — |
| Front windshield wiper command | Command to control the front windshield wiper of the vehicle platform | N/A | — |
| Rear windshield wiper command | Command to control the rear windshield wiper mode of the vehicle platform | N/A | — |
| HVAC (1st row) operation command | Command to start/stop 1st row air conditioning control | N/A | — |
| HVAC (2nd row) operation command | Command to start/stop 2nd row air conditioning control | N/A | — |
| Target temperature (1st left) command | Command to set the target temperature around front left area | N/A | — |
| Target temperature (1st right) command | Command to set the target temperature around front right area | N/A | — |
| Target temperature (2nd left) command | Command to set the target temperature around rear left area | N/A | — |
| Target temperature (2nd right) command | Command to set the target temperature around rear right area | N/A | — |
| HVAC fan (1st row) command | Command to set the fan level on the front AC | N/A | — |
| HVAC fan (2nd row) command | Command to set the fan level on the rear AC | N/A | — |
| Air outlet (1st row) command | Command to set the mode of 1st row air outlet | N/A | — |
| Air outlet (2nd row) command | Command to set the mode of 2nd row air outlet | N/A | — |
| Air recirculation command | Command to set the air recirculation mode | N/A | — |
| AC mode command | Command to set the AC mode | N/A | — |

4.2.1.2. Outputs

TABLE 17

Output APIs for BODY Control

| Signal Name | Description | Redundancy | Usage Guide |
|---|---|---|---|
| Turnsignal status | Status of the current turnsignallight mode of the vehicle platform | N/A | — |
| Headlight status | Status of the current headlight mode of the vehicle platform | N/A | — |
| Hazardlight status | Status of the current hazardlight mode of the vehicle platform | N/A | — |
| Horn status | Status of the current horn of the vehicle platform | N/A | — |
| Front windshield wiper status | Status of the current front windshield wiper mode of the vehicle platform | N/A | — |
| Rear windshield wiper status | Status of the current rear windshield wiper mode of the vehicle platform | N/A | — |
| HVAC (1st row) status | Status of activation of the $1^{st}$ row HVAC | N/A | — |

TABLE 17-continued

Output APIs for BODY Control

| Signal Name | Description | Redundancy | Usage Guide |
|---|---|---|---|
| HVAC (2nd row) status | Status of activation of the $2^{nd}$ row HVAC | N/A | — |
| Target temperature (1st left) status | Status of set temperature of $1^{st}$ row left | N/A | — |
| Target temperature (1st right) status | Status of set temperature of $1^{st}$ row right | N/A | — |
| Target temperature (2nd left) status | Status of set temperature of $2^{nd}$ row left | N/A | — |
| Target temperature (2nd right) status | Status of set temperature of $2^{nd}$ row right | N/A | — |
| HVAC fan (1st row) status | Status of set fan level of $1^{st}$ row | N/A | — |
| HVAC fan (2nd row) status | Status of set fan level of $2^{nd}$ row | N/A | — |
| Air outlet (1st row) status | Status of mode of 1st row air outlet | N/A | — |
| Air outlet (2nd row) status | Status of mode of 2nd row air outlet | N/A | — |
| Air recirculation status | Status of set air recirculation mode | N/A | — |
| AC mode status | Status of set AC mode | N/A | — |
| Seat occupancy (1st right) status | Seat occupancy status in 1st left seat | N/A | — |
| Seat belt (1st left) status | Status of driver's seat belt buckle switch | N/A | — |
| Seat belt (1st right) status | Status of passenger's seat belt buckle switch | N/A | — |
| Seat belt (2nd left) status | Seat belt buckle switch status in 2nd left seat | N/A | — |
| Seat belt (2nd right) status | Seat belt buckle switch status in 2nd right seat | N/A | — |

4.3. APIs for Power Control 4.3.1. API List for Power Control
4.3.1.1. Inputs

TABLE 18

Input APIs for Power Control

| Signal Name | Description | Redundancy | Usage Guide |
|---|---|---|---|
| Power mode command | Command to control the power mode of VP | N/A | — |

4.3.1.2. Outputs

TABLE 19

Output APIs for Power Control

| Signal Name | Description | Redundancy | Usage Guide |
|---|---|---|---|
| Power mode status | Status of the current power mode of VP | N/A | — |

4.4. APIs for Failure Notification 4.4.1. API List for Failure Notification
4.4.1.1. Inputs

TABLE 20

Input APIs for Failure Notification

| Signal Name | Description | Redundancy | Usage guide |
|---|---|---|---|
| N/A | — | — | — |

4.4.1.2. Outputs

TABLE 21

Output APIs for Failure Notification

| Signal Name | Description | Redundancy | Usage guide |
|---|---|---|---|
| Request for ADS Operation | — | Applied | — |
| Impact detection signal | — | N/A | — |
| Performance deterioration of Brake system | — | Applied | — |
| Performance deterioration of Propulsion system | — | N/A | — |
| Performance deterioration of Shift control system | — | N/A | — |
| Performance deterioration of Immobilization system | — | Applied | — |
| Performance deterioration of Steering system | — | Applied | — |
| Performance deterioration of Power supply system | — | Applied | — |
| Performance deterioration of Communication system | — | Applied | — |

4.5. APIs for Security 4.5.1. API List for Security

Input and output APIs for Security are shown in Table 22 and Table 23, respectively. Usage guides of some APIs are presented in the following sections as indicated in each table.

4.5.1.1. Inputs

TABLE 22

Input APIs for Security

| Signal Name | Description | Redundancy | Usage Guide |
|---|---|---|---|
| Door Lock (front) command | Command to control 1st both doors lock | N/A | — |

TABLE 22-continued

Input APIs for Security

| Signal Name | Description | Redundancy | Usage Guide |
|---|---|---|---|
| Door Lock (rear) command | Command to control 2nd both doors and trunk lock | N/A | — |
| Central door lock command | Command to control the all door lock | N/A | — |
| Device Authentication Signature the 1st word | This is the 8th byte from the 1st byte of the Signature value. | N/A | 4.5.2.1 |
| Device Authentication Signature the 2nd word | This is the 16th byte from the 9th byte of the Signature value. | N/A | 4.5.2.1 |
| Device Authentication Signature the 3rd word | This is the 24th byte from the 17th byte of the Signature value. | N/A | 4.5.2.1 |
| Device Authentication Signature the 4th word | This is the 32th byte from the 25th byte of the Signature value. | N/A | 4.5.2.1 |

4.5.1.2. Outputs

TABLE 23

Output APIs for Security

| Signal Name | Description | Redundancy | Usage Guide |
|---|---|---|---|
| Door lock (1st left) status | Status of the current 1st-left door lock | N/A | — |
| Door lock (1st right) status | Status of the current 1st-right door lock | N/A | — |
| Door lock (2nd left) status | Status of the current 2nd-left door lock | N/A | — |
| Door lock (2nd right) status | Status of the current 2nd-right door lock | N/A | — |
| Central door lock status | Status of the current all door lock | N/A | — |
| Alarm system status | Status of the current vehicle alarm | N/A | — |
| Device Authentication Seed the 1st word | This is the 8th byte from the 1st byte of the Seed value. | N/A | — |
| Device Authentication Seed the 2nd word | This is the 16th byte from the 9th byte of the Seed value. | N/A | — |
| Trip Counter | This counter is incremented in units of trips by the Freshness Value management master ECU. | N/A | — |
| Reset Counter | This counter is incremented periodically by the Freshness Value management master ECU. | N/A | — |
| 1st Left Door Open Status | Status of the current 1st-left door open/close of the vehicle platform | N/A | — |
| 1st Right Door Open Status | Status of the current 1st-right door open/close of the vehicle platform | N/A | — |
| 2nd Left Door Open Status | Status of the current 2nd-left door open/close of the vehicle platform | N/A | — |
| 2nd Right Door Open Status | Status of the current 2nd-right door open/close of the vehicle platform | N/A | — |
| Trunk Status | Status of the current trunk door open of the vehicle platform | N/A | — |
| Hood Open Status | Status of the current hood open/close of the vehicle platform | N/A | — |

4.5.2. API Guides in Details for Security
4.5.2.1. Device Authentication Protocol Device authentication is applied when the VCIB is activated from "Sleep" mode.

After the authentication succeeds, the VCIB can start to communicate with ADK.

Figure 17:
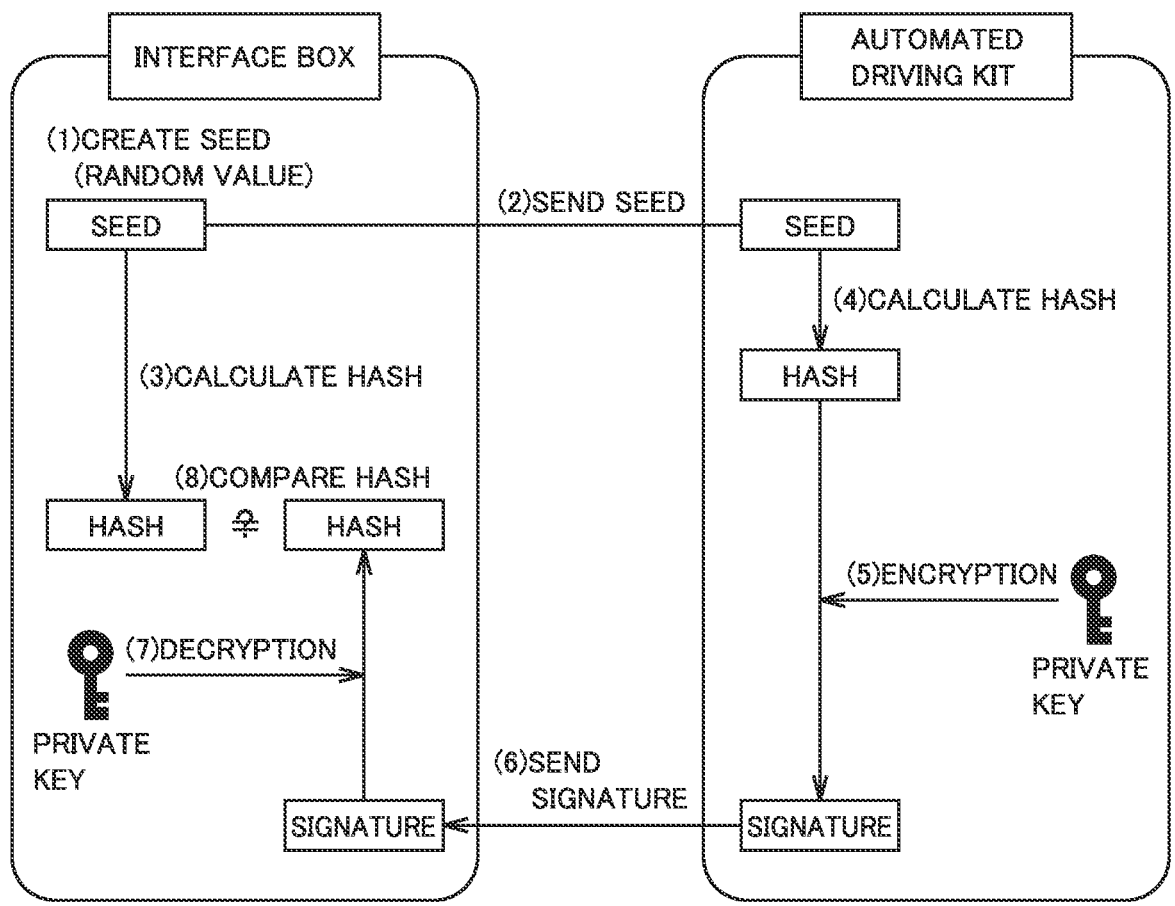
FIG. 17 is a diagram showing an authentication process.

Authentication process is as shown in FIG. 17 Authentication Process.

Authentication Specification

| Item | Specification | Note |
|---|---|---|
| Encryption algorithms | AES | FIPS 197 |
| Key length | 128 bit | — |
| Block cipher modes of operation | CBC | SP 800-38A |
| Hash algorithms | SHA-256 | FIPS 180-4 |
| Seed length | 128 bit | — |
| Signature length | 256 bit | — |

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A vehicle on which an autonomous driving system is mountable, the vehicle comprising:

a vehicle platform that carries out vehicle control in accordance with a command from the autonomous driving system, wherein the vehicle platform includes a base vehicle and a vehicle control interface box that interfaces between the autonomous driving system and the base vehicle, from the autonomous driving system to the base vehicle, an immobilization command including a first value indicating a request for immobilization of the vehicle is transmitted through the vehicle control interface box, from the base vehicle to the autonomous driving system, a signal indicating a standstill status of the vehicle is transmitted through the vehicle control interface box, the immobilization command is transmitted from the autonomous driving system through the vehicle control interface box to the base vehicle when a first condition including a condition that the vehicle is in the standstill status is satisfied, and the base vehicle carries out immobilization of the vehicle in accordance with the immobilization command.

2. The vehicle according to claim 1, wherein the immobilization command further includes a second value indicating a request for release of immobilization of the vehicle, the immobilization command including the second value is transmitted from the autonomous driving system through the vehicle control interface box to the base vehicle when a second condition including a condition that the vehicle is in the standstill status is satisfied, and the base vehicle releases immobilization of the vehicle in accordance with the immobilization command.

3. The vehicle according to claim 1, wherein the first condition further includes a condition that predetermined time has elapsed since the vehicle came to a standstill.

4. The vehicle according to claim 1, wherein the base vehicle carries out immobilization of the vehicle when predetermined time has elapsed since the base vehicle received the immobilization command including the first value.

5. The vehicle according to claim 1, wherein from the autonomous driving system to the base vehicle, an acceleration command including a deceleration value is transmitted through the vehicle control interface box, and when the immobilization command requests immobilization of the vehicle, the acceleration command including a constant deceleration value is transmitted from the autonomous driving system through the vehicle control interface box to the base vehicle during a period from a standstill of the vehicle until issuance of a request for release of immobilization of the vehicle.

6. A method of controlling a vehicle on which an autonomous driving system is mountable, the vehicle including a vehicle platform that carries out vehicle control in accordance with a command from the autonomous driving system, the vehicle platform including a base vehicle and a vehicle control interface box that interfaces between the autonomous driving system and the base vehicle, the method comprising:

transmitting an immobilization command including a first value indicating a request for immobilization of the vehicle from the autonomous driving system to the base vehicle through the vehicle control interface box;

transmitting a signal indicating a standstill status of the vehicle from the base vehicle to the autonomous driving system through the vehicle control interface box;

transmitting the immobilization command from the autonomous driving system through the vehicle control interface box to the base vehicle when a first condition including a condition that the vehicle is in the standstill status is satisfied; and carrying out, by the base vehicle, immobilization of the vehicle in accordance with the immobilization command.

7. The method of controlling a vehicle according to claim 6, wherein the immobilization command further includes a second value indicating a request for release of immobilization of the vehicle, and the method further comprises:

transmitting the immobilization command including the second value from the autonomous driving system through the vehicle control interface box to the base vehicle when a second condition including a condition that the vehicle is in the standstill status is satisfied; and releasing, by the base vehicle, immobilization of the vehicle in accordance with the immobilization command.

8. The method of controlling a vehicle according to claim 6, wherein the first condition further includes a condition that predetermined time has elapsed since the vehicle came to a standstill.

9. The method of controlling a vehicle according to claim 6, further comprising carrying out, by the base vehicle, immobilization of the vehicle when predetermined time has elapsed since the base vehicle received the immobilization command including the first value.

10. The method of controlling a vehicle according to claim 6, further comprising:

transmitting an acceleration command including a deceleration value from the autonomous driving system to the base vehicle through the vehicle control interface box; and transmitting, when the immobilization command requests immobilization of the vehicle, the acceleration command including a constant deceleration value from the autonomous driving system through the vehicle control interface box to the base vehicle during a period from a standstill of the vehicle until issuance of a request for release of immobilization of the vehicle.

11. A vehicle control interface box that interfaces between an autonomous driving system and a vehicle on which the autonomous driving system is mountable, the vehicle including a vehicle platform that carries out vehicle control in accordance with a command from the autonomous driving system, the vehicle platform including a base vehicle, wherein the vehicle control interface box transmits an immobilization command including a first value indicating a request for immobilization of the vehicle from the autonomous driving system to the base vehicle, transmits a signal indicating a standstill status of the vehicle from the base vehicle to the autonomous driving system, and transmits the immobilization command from the autonomous driving system to the base vehicle when a first condition including a condition that the vehicle is in the standstill status is satisfied.

12. The vehicle control interface box according to claim 11, wherein the immobilization command further includes a second value indicating a request for release of immobilization of the vehicle, and the vehicle control interface box transmits the immobilization command including the second value from the autonomous driving system to the base vehicle when a second condition including a condition that the vehicle is in the standstill status is satisfied.

13. The vehicle control interface box according to claim 11, wherein the first condition further includes a condition that predetermined time has elapsed since the vehicle came to a standstill.

14. The vehicle control interface box according to claim 11, wherein the vehicle control interface box transmits an acceleration command including a deceleration value from the autonomous driving system to the base vehicle, and transmits, when the immobilization command requests immobilization of the vehicle, the acceleration command including a constant deceleration value from the autonomous driving system to the base vehicle during a period from a standstill of the vehicle until issuance of a request for release of immobilization of the vehicle.

* * * * *